/

US008085273B2

(12) United States Patent
Bakalash et al.

(10) Patent No.: US 8,085,273 B2
(45) Date of Patent: Dec. 27, 2011

(54) MULTI-MODE PARALLEL GRAPHICS RENDERING SYSTEM EMPLOYING REAL-TIME AUTOMATIC SCENE PROFILING AND MODE CONTROL

(75) Inventors: Reuven Bakalash, Shdema (IL); Yaniv Leviathan, Savyon (IL)

(73) Assignee: Lucid Information Technology, Ltd, Kfar Netter (IL)

( * ) Notice: Subject to any disclaimer, the term of this patent is extended or adjusted under 35 U.S.C. 154(b) by 99 days.

(21) Appl. No.: 11/655,735

(22) Filed: Jan. 18, 2007

(65) Prior Publication Data

US 2008/0117217 A1      May 22, 2008

Related U.S. Application Data

(63) Continuation-in-part of application No. 11/386,454, filed on Mar. 22, 2006, now Pat. No. 7,834,880, and a continuation-in-part of application No. 11/340,402, filed on Jan. 25, 2006, now Pat. No. 7,812,844, which is a continuation-in-part of application No. 10/579,682, filed as application No. PCT/IL2004/001069 on Nov. 19, 2004, now Pat. No. 7,808,499.

(60) Provisional application No. 60/759,608, filed on Jan. 18, 2006, provisional application No. 60/647,146, filed on Jan. 25, 2005, provisional application No. 60/523,084, filed on Nov. 19, 2003.

(51) Int. Cl.
   *G06F 15/80* (2006.01)
(52) U.S. Cl. ........ 345/505; 345/501; 345/502; 345/503; 345/504; 345/506; 382/304; 718/102; 718/103; 718/104; 718/105; 718/108; 712/32; 712/33; 712/34

(58) Field of Classification Search .......... 345/501–506; 382/304; 718/102–108; 712/32–34
See application file for complete search history.

(56) References Cited

U.S. PATENT DOCUMENTS

| 5,475,856 A | 12/1995 | Kogge |
| 5,535,410 A | 7/1996 | Watanabe et al. |
| 5,687,357 A | 11/1997 | Priem |

(Continued)

FOREIGN PATENT DOCUMENTS

WO     WO 2004/070652 A2     8/2004

OTHER PUBLICATIONS

Powerpoint presentation entitled, "Go Multiple" by Dennis Yang, Conference Platform , 2007,11 pages.

(Continued)

*Primary Examiner* — Andrew Wang
*Assistant Examiner* — Abderrahim Merouan
(74) *Attorney, Agent, or Firm* — Thomas J. Perkowski, Esq., P.C.

(57) ABSTRACT

A multi-mode parallel 3-D graphics system having multiple graphics processing pipelines with multiple GPUs supporting a parallel graphics rendering process having time, frame and object division modes of operation, wherein each GPU comprises video memory, a geometry processing subsystem and a pixel processing subsystem, and wherein 3D scene profiling is performed in real-time, and the parallelization state/modes of the system are dynamically controlled to meet graphics application requirements. The multiple modes of parallel graphics rendering use real-time graphics application profiling, and dynamic control over time-division, frame-division, and object-division modes of parallel operation, within the same parallel graphics platform, which can be realized on PC-based computing system architectures.

21 Claims, 28 Drawing Sheets

U.S. PATENT DOCUMENTS

| | | | |
|---|---|---|---|
| 5,696,892 A * | 12/1997 | Redmann et al. | 345/582 |
| 5,740,464 A | 4/1998 | Priem et al. | |
| 5,745,762 A | 4/1998 | Celi, Jr. et al. | |
| 5,754,866 A | 5/1998 | Priem | |
| 5,757,385 A | 5/1998 | Narayanaswami et al. | |
| 5,758,182 A | 5/1998 | Rosenthal et al. | |
| 5,794,016 A | 8/1998 | Kelleher | |
| 5,841,444 A * | 11/1998 | Mun et al. | 345/506 |
| 5,909,595 A | 6/1999 | Rosenthal et al. | |
| 6,118,462 A | 9/2000 | Mergulis | |
| 6,169,553 B1 | 1/2001 | Fuller et al. | |
| 6,181,352 B1 | 1/2001 | Kirk et al. | |
| 6,184,908 B1 | 2/2001 | Chan et al. | |
| 6,188,412 B1 | 2/2001 | Morein | |
| 6,191,800 B1 | 2/2001 | Arenburg et al. | |
| 6,201,545 B1 | 3/2001 | Wong et al. | |
| 6,212,261 B1 | 4/2001 | Meubus et al. | |
| 6,212,617 B1 | 4/2001 | Hardwick | |
| 6,259,460 B1 | 7/2001 | Gossett et al. | |
| 6,288,418 B1 | 9/2001 | Reed et al. | |
| 6,292,200 B1 | 9/2001 | Bowen et al. | |
| 6,333,744 B1 | 12/2001 | Kirk et al. | |
| 6,337,686 B2 | 1/2002 | Wong et al. | |
| 6,352,479 B1 | 3/2002 | Sparks, II | |
| 6,415,345 B1 | 7/2002 | Wu et al. | |
| 6,442,656 B1 | 8/2002 | Alasti et al. | |
| 6,462,737 B2 | 10/2002 | Lindholm et al. | |
| 6,473,086 B1 * | 10/2002 | Morein et al. | 345/505 |
| 6,473,089 B1 | 10/2002 | Wei et al. | |
| 6,477,687 B1 | 11/2002 | Thomas | |
| 6,492,987 B1 | 12/2002 | Morein | |
| 6,496,187 B1 * | 12/2002 | Deering et al. | 345/419 |
| 6,496,404 B1 | 12/2002 | Fiedler et al. | |
| 6,502,173 B1 | 12/2002 | Aleksic et al. | |
| 6,529,198 B1 * | 3/2003 | Miyauchi | 345/505 |
| 6,529,331 B2 * | 3/2003 | Massof et al. | 359/630 |
| 6,532,013 B1 | 3/2003 | Papakipos et al. | |
| 6,532,525 B1 | 3/2003 | Aleksic et al. | |
| 6,535,209 B1 | 3/2003 | Abdalla et al. | |
| 6,542,971 B1 | 4/2003 | Reed | |
| 6,557,065 B1 | 4/2003 | Peleg et al. | |
| 6,577,309 B2 | 6/2003 | Lindholm et al. | |
| 6,577,320 B1 | 6/2003 | Kirk | |
| 6,578,068 B1 | 6/2003 | Bowman-Amuah | |
| 6,593,923 B1 | 7/2003 | Donovan et al. | |
| 6,633,296 B1 | 10/2003 | Laksono et al. | |
| 6,636,212 B1 | 10/2003 | Zhu | |
| 6,636,215 B1 | 10/2003 | Greene | |
| 6,646,639 B1 | 11/2003 | Greene et al. | |
| 6,650,330 B2 | 11/2003 | Lindholm et al. | |
| 6,650,331 B2 | 11/2003 | Lindholm et al. | |
| 6,657,635 B1 | 12/2003 | Hutchins et al. | |
| 6,662,257 B1 | 12/2003 | Caruk et al. | |
| 6,664,960 B2 | 12/2003 | Goel et al. | |
| 6,664,963 B1 | 12/2003 | Zatz | |
| 6,670,958 B1 | 12/2003 | Aleksic et al. | |
| 6,677,953 B1 | 1/2004 | Twardowski et al. | |
| 6,683,614 B2 | 1/2004 | Walls et al. | |
| 6,690,372 B2 | 2/2004 | Donovan et al. | |
| 6,691,180 B2 | 2/2004 | Priem et al. | |
| 6,700,583 B2 | 3/2004 | Fowler et al. | |
| 6,704,025 B1 | 3/2004 | Bastos et al. | |
| 6,724,394 B1 | 4/2004 | Zatz et al. | |
| 6,725,457 B1 | 4/2004 | Priem et al. | |
| 6,728,820 B1 | 4/2004 | Brian et al. | |
| 6,731,298 B1 | 5/2004 | Moreton et al. | |
| 6,734,861 B1 | 5/2004 | Van Dyke et al. | |
| 6,734,874 B2 | 5/2004 | Lindholm et al. | |
| 6,741,243 B2 | 5/2004 | Lewis et al. | |
| 6,744,433 B1 | 6/2004 | Bastos et al. | |
| 6,753,878 B1 | 6/2004 | Heirich et al. | |
| 6,774,895 B1 | 8/2004 | Papakipos et al. | |
| 6,778,176 B2 | 8/2004 | Lindholm et al. | |
| 6,778,177 B1 | 8/2004 | Furtner | |
| 6,778,181 B1 | 8/2004 | Kilgariff et al. | |
| 6,778,189 B1 | 8/2004 | Kilgard | |
| 6,779,069 B1 | 8/2004 | Treichler et al. | |
| 6,789,154 B1 | 9/2004 | Lee et al. | |
| 6,797,998 B2 | 9/2004 | Dewey et al. | |
| 6,801,202 B2 | 10/2004 | Nelson et al. | |
| 6,812,927 B1 | 11/2004 | Cutler et al. | |
| 6,825,843 B2 | 11/2004 | Allen et al. | |
| 6,828,980 B1 | 12/2004 | Moreton et al. | |
| 6,828,987 B2 | 12/2004 | Swan | |
| 6,831,652 B1 | 12/2004 | Orr | |
| 6,842,180 B1 | 1/2005 | Maiyuran et al. | |
| 6,844,879 B2 | 1/2005 | Miyaushi | |
| 6,856,320 B1 | 2/2005 | Rubinstein et al. | |
| 6,864,893 B2 | 3/2005 | Zatz | |
| 6,864,984 B2 | 3/2005 | Naya et al. | |
| 6,870,540 B1 | 3/2005 | Lindholm et al. | |
| 6,876,362 B1 | 4/2005 | Newhall, Jr. et al. | |
| 6,885,376 B2 | 4/2005 | Tang-Petersen et al. | |
| 6,894,687 B1 | 5/2005 | Kilgard et al. | |
| 6,894,689 B1 | 5/2005 | Greene et al. | |
| 6,900,810 B1 | 5/2005 | Moreton et al. | |
| 6,938,176 B1 | 8/2005 | Alben et al. | |
| 6,940,515 B1 | 9/2005 | Moreton et al. | |
| 6,947,047 B1 | 9/2005 | Moy et al. | |
| 6,947,865 B1 | 9/2005 | Mimberg et al. | |
| 6,952,206 B1 | 10/2005 | Craighead | |
| 6,959,110 B1 | 10/2005 | Danskin et al. | |
| 6,961,057 B1 | 11/2005 | Van Dyke et al. | |
| 6,975,319 B1 | 12/2005 | Donovan et al. | |
| 6,980,209 B1 | 12/2005 | Donham et al. | |
| 6,982,718 B2 | 1/2006 | Kilgard et al. | |
| 6,985,152 B2 | 1/2006 | Rubinstein et al. | |
| 6,989,840 B1 | 1/2006 | Everitt et al. | |
| 6,992,667 B2 | 1/2006 | Lindholm et al. | |
| 6,995,767 B1 | 2/2006 | Donovan et al. | |
| 6,999,076 B2 | 2/2006 | Morein | |
| 7,002,588 B1 | 2/2006 | Lindholm et al. | |
| 7,015,915 B1 | 3/2006 | Diard | |
| 7,023,437 B1 | 4/2006 | Voorhies et al. | |
| 7,027,972 B1 | 4/2006 | Lee | |
| 7,038,678 B2 | 5/2006 | Bunnell | |
| 7,038,685 B1 | 5/2006 | Lindholm | |
| 7,038,692 B1 | 5/2006 | Priem et al. | |
| 7,051,139 B2 | 5/2006 | Peleg et al. | |
| 7,053,901 B2 | 5/2006 | Huang et al. | |
| 7,064,763 B2 | 6/2006 | Lindholm et al. | |
| 7,068,272 B1 | 6/2006 | Voorhies et al. | |
| 7,068,278 B1 | 6/2006 | Williams et al. | |
| 7,075,541 B2 | 7/2006 | Diard | |
| 7,080,194 B1 | 7/2006 | Van Dyke | |
| 7,081,895 B2 | 7/2006 | Papalopos et al. | |
| 7,091,971 B2 | 8/2006 | Morein | |
| 7,095,414 B2 | 8/2006 | Lindholm et al. | |
| 7,098,922 B1 | 8/2006 | Bastos et al. | |
| 7,119,808 B2 | 10/2006 | Goncalez et al. | |
| 7,120,816 B2 | 10/2006 | Williams et al. | |
| 7,123,266 B2 | 10/2006 | Wei et al. | |
| 7,129,909 B1 | 10/2006 | Dong et al. | |
| 7,130,316 B2 | 10/2006 | Kovacevic | |
| 7,142,215 B1 | 11/2006 | Papakipos et al. | |
| 7,145,565 B2 | 12/2006 | Everitt et al. | |
| 7,170,513 B1 | 1/2007 | Voorhies et al. | |
| 7,170,515 B1 | 1/2007 | Zhu | |
| 7,224,359 B1 | 5/2007 | Papakipos et al. | |
| 7,248,261 B1 | 7/2007 | Hakura | |
| 7,289,125 B2 | 10/2007 | Diard et al. | |
| 7,324,111 B2 | 1/2008 | Diamond | |
| 7,324,547 B1 | 1/2008 | Alfieri et al. | |
| 7,325,086 B2 | 1/2008 | Kong et al. | |
| 7,372,465 B1 | 5/2008 | Tamasi et al. | |
| 7,477,256 B1 | 1/2009 | Johnson | |
| 2001/0029556 A1 | 10/2001 | Priem et al. | |
| 2002/0015055 A1 | 2/2002 | Foran | |
| 2002/0059302 A1 | 5/2002 | Ebihara | |
| 2002/0085007 A1 | 7/2002 | Nelson et al. | |
| 2002/0118308 A1 | 8/2002 | Dujmenovic | |
| 2002/0145612 A1 | 10/2002 | Blythe et al. | |
| 2002/0180740 A1 | 12/2002 | Lindholm et al. | |
| 2002/0196259 A1 | 12/2002 | Lindholm et al. | |
| 2003/0020720 A1 | 1/2003 | Lindholm et al. | |
| 2003/0034975 A1 | 2/2003 | Lindholm et al. | |
| 2003/0038808 A1 | 2/2003 | Lindholm et al. | |

| | | |
|---|---|---|
| 2003/0080959 A1 | 5/2003 | Morein |
| 2003/0103054 A1 | 6/2003 | Montrym et al. |
| 2003/0112245 A1 | 6/2003 | Lindholm et al. |
| 2003/0112246 A1 | 6/2003 | Lindholm et al. |
| 2003/0117971 A1 | 6/2003 | Aubury |
| 2003/0128197 A1 | 7/2003 | Turner et al. |
| 2003/0151606 A1 | 8/2003 | Morein |
| 2003/0164832 A1 | 9/2003 | Alcorn |
| 2003/0164834 A1 | 9/2003 | Lefebvre et al. |
| 2003/0171907 A1* | 9/2003 | Gal-On et al. ............ 703/14 |
| 2003/0179220 A1 | 9/2003 | Dietrich, Jr. et al. |
| 2003/0188075 A1 | 10/2003 | Peleh et al. |
| 2003/0189565 A1 | 10/2003 | Lindholm et al. |
| 2003/0212735 A1 | 11/2003 | Hicok et al. |
| 2004/0012600 A1 | 1/2004 | Deering et al. |
| 2004/0036159 A1 | 2/2004 | Bruno |
| 2004/0153778 A1 | 8/2004 | Cheng |
| 2004/0169651 A1 | 9/2004 | Everitt et al. |
| 2004/0179019 A1 | 9/2004 | Sabella et al. |
| 2004/0196289 A1 | 10/2004 | Langendorf et al. |
| 2004/0207618 A1 | 10/2004 | William et al. |
| 2004/0210788 A1 | 10/2004 | Williams et al. |
| 2004/0223003 A1 | 11/2004 | Heirich et al. |
| 2004/0250231 A1* | 12/2004 | Killian et al. ............ 716/18 |
| 2004/0268347 A1* | 12/2004 | Knauerhase et al. ....... 718/1 |
| 2005/0041031 A1 | 2/2005 | Diard |
| 2005/0081115 A1 | 4/2005 | Cheng et al. |
| 2005/0122330 A1 | 6/2005 | Boyd et al. |
| 2005/0162437 A1 | 7/2005 | Morein et al. |
| 2005/0166207 A1 | 7/2005 | Baba et al. |
| 2005/0190189 A1 | 9/2005 | Chefd'hotel et al. |
| 2005/0190190 A1 | 9/2005 | Diard et al. |
| 2005/0195186 A1 | 9/2005 | Mitchell et al. |
| 2005/0195187 A1 | 9/2005 | Seiler et al. |
| 2005/0206646 A1 | 9/2005 | Alcorn |
| 2005/0223124 A1 | 10/2005 | Reed |
| 2005/0225558 A1 | 10/2005 | Morein et al. |
| 2005/0237327 A1 | 10/2005 | Rubinstein et al. |
| 2005/0237329 A1 | 10/2005 | Rubinstein et al. |
| 2005/0243096 A1 | 11/2005 | Possley et al. |
| 2005/0243215 A1 | 11/2005 | Doswald et al. |
| 2005/0259103 A1 | 11/2005 | Kilgard et al. |
| 2005/0265064 A1 | 12/2005 | Ku et al. |
| 2005/0275760 A1 | 12/2005 | Gritz et al. |
| 2006/0005178 A1 | 1/2006 | Kilgard et al. |
| 2006/0028478 A1 | 2/2006 | Rubinstein et al. |
| 2006/0055695 A1 | 3/2006 | Abdalla et al. |
| 2006/0059494 A1 | 3/2006 | Wexler et al. |
| 2006/0101218 A1 | 5/2006 | Reed |
| 2006/0114260 A1 | 6/2006 | Diard |
| 2006/0119607 A1 | 6/2006 | Lindholm et al. |
| 2006/0120376 A1 | 6/2006 | Duncan et al. |
| 2006/0123142 A1 | 6/2006 | Duncan et al. |
| 2006/0156399 A1 | 7/2006 | Parmer et al. |
| 2006/0202941 A1 | 9/2006 | Morein et al. |
| 2006/0208960 A1 | 9/2006 | Glen |
| 2006/0221086 A1 | 10/2006 | Diard |
| 2006/0221087 A1 | 10/2006 | Diard |
| 2006/0225061 A1 | 10/2006 | Ludwig et al. |
| 2006/0248241 A1 | 11/2006 | Danilak |
| 2006/0267987 A1 | 11/2006 | Litchmanov |
| 2006/0268005 A1 | 11/2006 | Hutchins et al. |
| 2006/0271713 A1 | 11/2006 | Xie et al. |
| 2006/0274073 A1 | 12/2006 | Johnson et al. |
| 2006/0282604 A1 | 12/2006 | Temkine et al. |
| 2006/0290700 A1 | 12/2006 | Gonzalez et al. |
| 2007/0159488 A1 | 7/2007 | Danskin et al. |
| 2007/0195099 A1 | 8/2007 | Diard et al. |
| 2008/0007559 A1 | 1/2008 | Kalaiah et al. |
| 2008/0143731 A1 | 6/2008 | Cheng et al. |

OTHER PUBLICATIONS

Scientific publication entitled, "Chromium; A Stream-Processing Framework for Interactive Rendering on Clusters" from Stanford University, Lawrence Livermore National Laboratory, and IBM T.J. Watson Research Center, 2007, 10 pages.
Scientific publication entitled "Hybrid Sort-First and Sort-Last Parallel Rendering With a Cluster of PCs" by Rudrajit Samanta et al., Princeton University, 12 pages, c. 2000.
EP 04 79 9376, Oct. 14, 2008.
PCT/IB07/03464, Sep. 22, 2008.
PCT/US07/26466, Jul. 16, 2008.
PCT/IB06/01529, Dec. 31, 2007.
PCT/IL04/001069, Jun. 30, 2005.
Publication by TW Crockett entitled, "An Introduction to Parallel Rendering", in Parallel Computing, 1997, Elsevier Science, 29 Pages.
Silicon Graphics, Inc. pdf. document entitled "OpenGL Multipipe™ SDK White Paper", 2002,2003, pp. 1-32.
Silicon Graphics, Inc. online document entitled "Additional Information for: OpenGL Multipipe™ SDK White Paper (IRIX 6.5)", published Feb. 1, 2003, 2 pages.
Technical publication by Li et al entiteled "ParVox—A Parallel Splatting Volume Rendering System for Distributed Visualization," Oct. 1997, 7 Pages.
Department of Computer Science, University of North Carolina publication by Molnar et al. entitled, "PixelFlow: High-Speed Rendering Using Image Composition," 1992, 10 Pages.

* cited by examiner

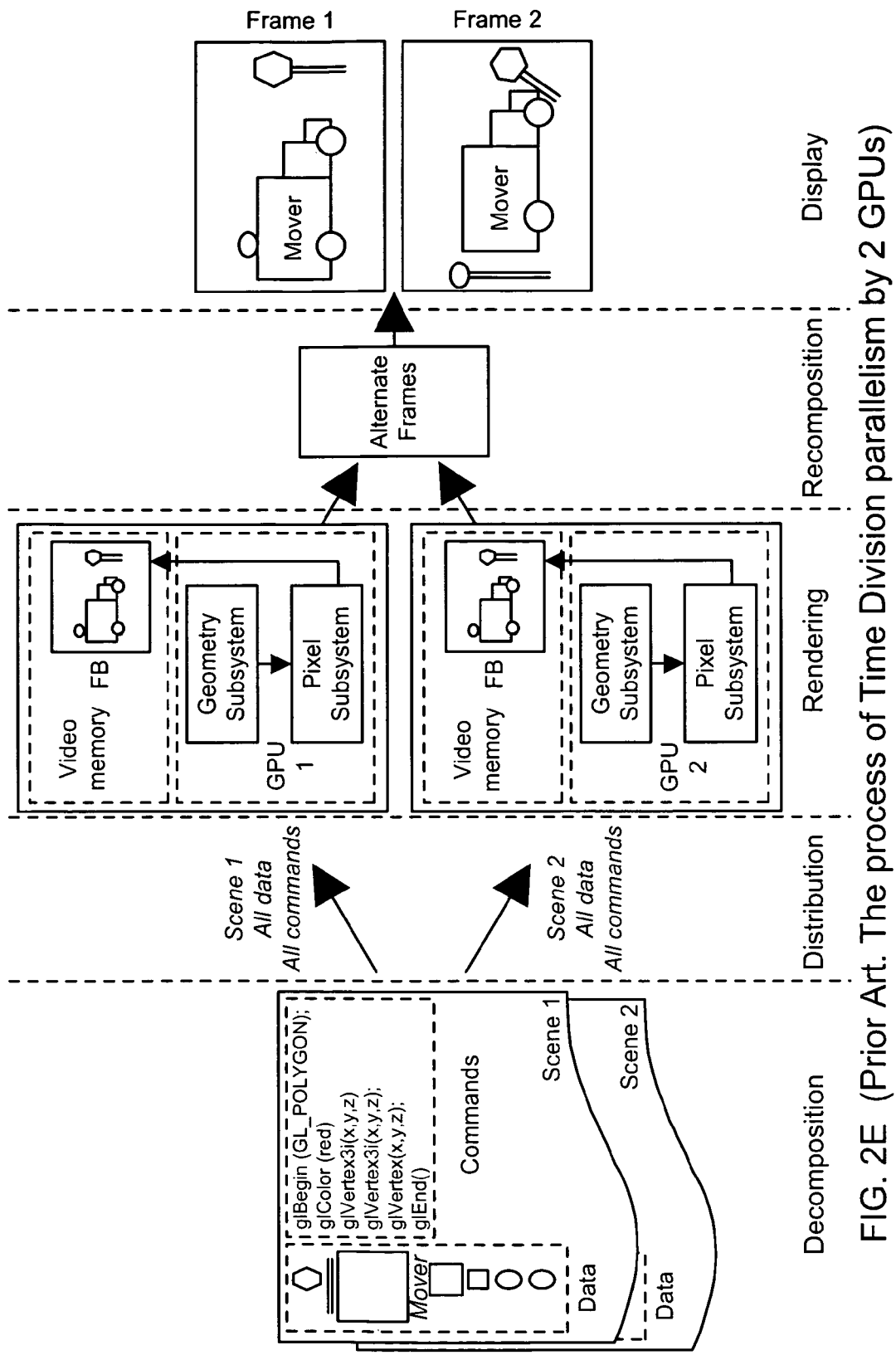
FIG. 2E (Prior Art. The process of Time Division parallelism by 2 GPUs)

Sub-states definitions

| Sub-state | Decompose A | Distribute B | Recompose C |
|---|---|---|---|
| 1 | Object decomp. | Divide | Test based |
| 2 | Image decomp. | Broadcast | Screen based |
| 3 | Alternate | Single | None |
| 4 | Single | | |

FIG. 4A1

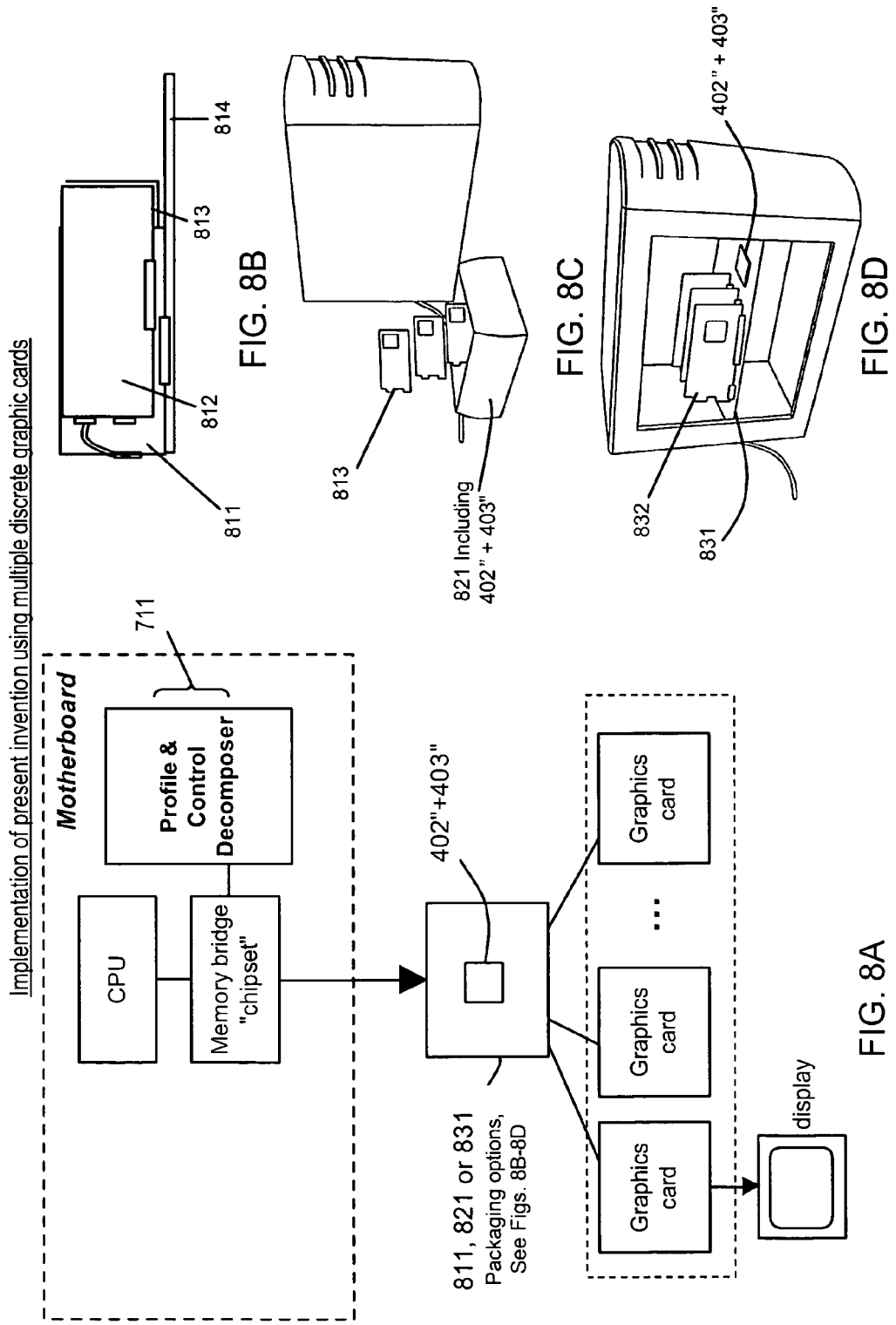

Host computer (desktop, laptop, server, etc.)

Host computer (desktop, laptop, server, etc.)

Host computer (desktop, laptop, server, etc.)

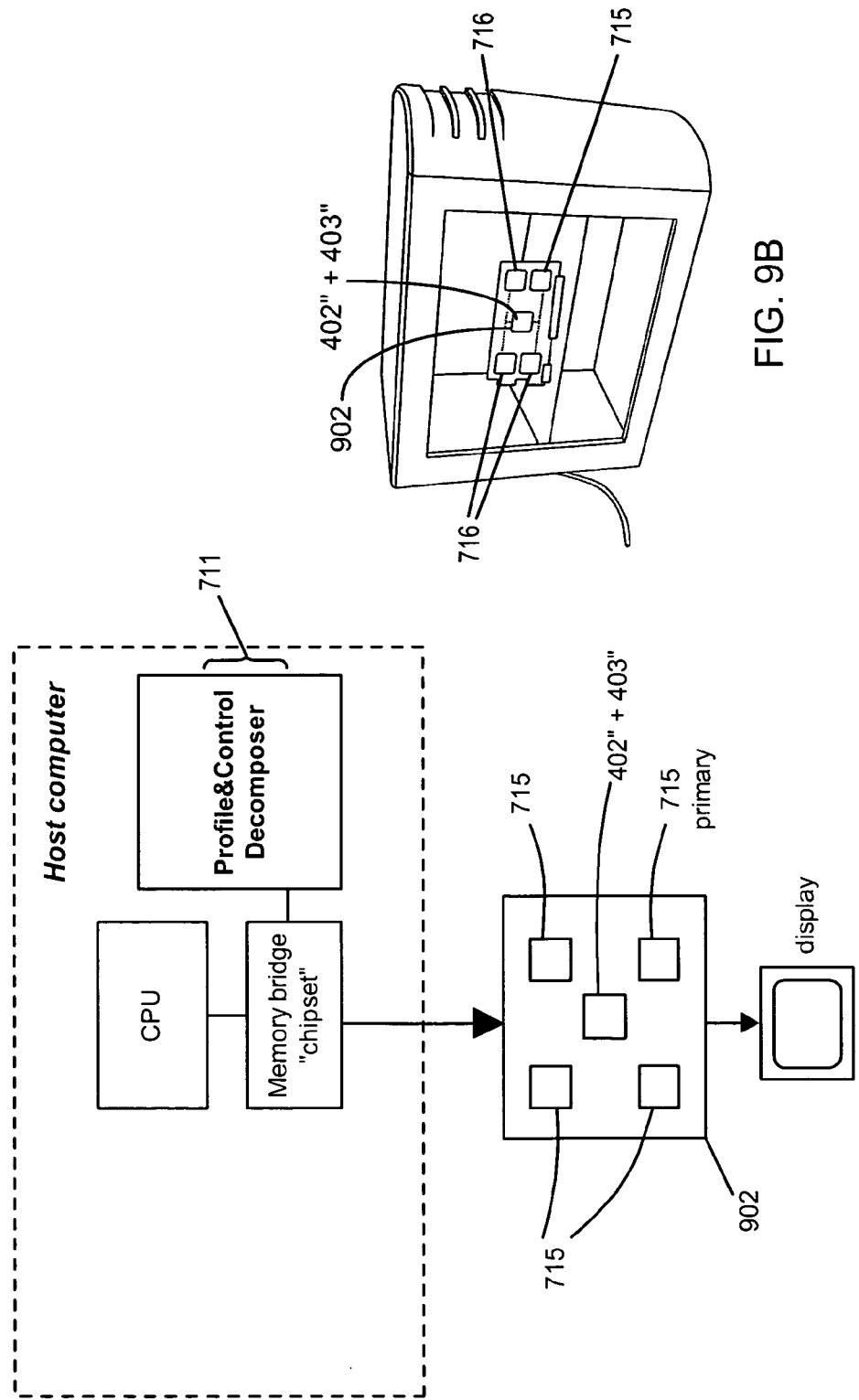

MULTI-MODE PARALLEL GRAPHICS RENDERING SYSTEM EMPLOYING REAL-TIME AUTOMATIC SCENE PROFILING AND MODE CONTROL

CROSS-REFERENCE TO RELATED CASES

The present application is a Continuation-in-Part (CIP) of the following Applications: Provisional Application Ser. No. 60/759,608 filed Jan. 18, 2006; U.S. application Ser. No. 11/386,454 filed Jan. 22, 2006; U.S. application Ser. No. 11/340,402, filed Jan. 25, 2006; which is based on Provisional Application Ser. No. 60/647,146, filed Jan. 25, 2005; U.S. application Ser. No. 10/579,682 filed May 17, 2006; which is a National Stage Entry of International Application No. PCT/IL2004/001069, filed Nov. 19, 2004; which is based on Provisional Application Ser. No. 60/523,084 filed Nov. 19, 2003; each said application being commonly owned by Lucid Information Technology, Ltd., and being incorporated herein by reference as if set forth fully herein.

BACKGROUND OF INVENTION

1. Field of Invention

The present invention relates generally to the field of computer graphics rendering, and more particularly, ways of and means for improving the performance of parallel graphics rendering processes supported on multiple GPU-based 3D graphics platforms associated with diverse types of computing machinery.

2. Brief Description of the State of Knowledge in the Art

There is a great demand for high performance three-dimensional (3D) computer graphics systems in the fields of product design, simulation, virtual-reality, video-gaming, scientific research, and personal computing (PC). Clearly a major goal of the computer graphics industry is to realize real-time photo-realistic 3D imagery on PC-based workstations, desktops, laptops, and mobile computing devices.

In general, there are two fundamentally different classes of machines in the 3D computer graphics field, namely: (1) Object-Oriented Graphics Systems, also known as Graphical Display List (GDL) Graphics Systems, wherein 3D scenes are represented as a complex of geometric objects (primitives) in 3D continuous geometric space, and 2D views or images of such 3D scenes are computed using geometrical projection, ray tracing, and light scattering/reflection/absorption modeling techniques, typically based upon laws of physics; and (2) VOlume ELement (VOXEL) Graphics Systems, wherein 3D scenes and objects are represented as a complex of voxels (x,y,z volume elements) represented in 3D Cartesian Space, and 2D views or images of such 3D voxel-based scenes are also computed using geometrical projection, ray tracing, and light scattering/reflection/absorption modeling techniques, again typically based upon laws of physics. Examples of early GDL-based graphics systems are disclosed in U.S. Pat. No. 4,862,155, whereas examples of early voxel-based 3D graphics systems are disclosed in U.S. Pat. No. 4,985,856, each incorporated herein by reference in its entirety.

In the contemporary period, most PC-based computing systems include a 3D graphics subsystem based the "Object-Orient Graphics" (or Graphical Display List) system design. In such graphics system design, "objects" within a 3D scene are represented by 3D geometrical models, and these geometrical models are typically constructed from continuous-type 3D geometric representations including, for example, 3D straight line segments, planar polygons, polyhedra, cubic polynomial curves, surfaces, volumes, circles, and quadratic objects such as spheres, cones, and cylinders. These 3D geometrical representations are used to model various parts of the 3D scene or object, and are expressed in the form of mathematical functions evaluated over particular values of coordinates in continuous Cartesian space. Typically, the 3D geometrical representations of the 3D geometric model are stored in the format of a graphical display list (i.e. a structured collection of 2D and 3D geometric primitives). Currently, planar polygons, mathematically described by a set of vertices, are the most popular form of 3D geometric representation.

Once modeled using continuous 3D geometrical representations, the 3D scene is graphically displayed (as a 2D view of the 3D geometrical model) along a particular viewing direction, by repeatedly scan-converting the graphical display list. At the current state of the art, the scan-conversion process can be viewed as a "computational geometry" process which involves the use of (i) a geometry processor (i.e. geometry processing subsystem or engine) as well as a pixel processor (i.e. pixel processing subsystem or engine) which together transform (i.e. project, shade and color) the display-list objects and bit-mapped textures, respectively, into an unstructured matrix of pixels. The composed set of pixel data is stored within a 2D frame buffer (i.e. Z buffer) before being transmitted to and displayed on the surface of a display screen.

A video processor/engine refreshes the display screen using the pixel data stored in the 2D frame buffer. Any changes in the 3D scene requires that the geometry and pixel processors repeat the whole computationally-intensive pixel-generation pipeline process, again and again, to meet the requirements of the graphics application at hand. For every small change or modification in viewing direction of the human system user, the graphical display list must be manipulated and repeatedly scan-converted. This, in turn, causes both computational and buffer contention challenges which slow down the working rate of the graphics system. To accelerate this computationally-intensive pipeline process, custom hardware including geometry, pixel and video engines, have been developed and incorporated into most conventional "graphics display-list" system designs.

In order to render a 3D scene (from its underlying graphical display lists) and produce high-resolution graphical projections for display on a display device, such as a LCD panel, early 3D graphics systems attempted to relieve the host CPU of computational loading by employing a single graphics pipeline comprising a single graphics processing unit (GPU), supported by video memory.

As shown in FIG. 1A, a typical PC based graphic architecture has an external graphics card (105). The main components of the graphics card (105) are the graphics processing unit (GPU) and video memory, as shown. As shown, the graphic card is connected to the display (106) on one side, and the CPU (101) through bus (e.g. PCIExpress) (107) and Memory Bridge (103, termed also "chipset", e.g. 975 by Intel), on the other side.

FIG. 1B illustrates a rendering of three successive frames by a single GPU. The application, assisted by graphics library, creates a stream of graphics commands and data describing a 3D scene. The stream is pipelined through the GPU's geometry and pixel subsystems to create a bitmap of pixels in the Frame Buffer, and finally displayed on a display screen. A sequence of successive frames generates a visual illusion of a dynamic picture.

As shown in FIG. 1B, the structure of a GPU subsystem on a graphic card comprises: a video memory which is external to GPU, and two 3D engines: (i) a transform bound geometry subsystem (224) for processing 3D graphics primitives; (ii) and a fill bound pixel subsystem (225). The video memory shares its storage resources among geometry buffer (222) through which all geometric (i.e. polygonal) data is transferred, commands buffer, texture buffers (223), and Frame Buffer (226).

Limitations of a single graphics pipeline rise from its typical bottlenecks. The first potential bottleneck (221) stems from transferring data from CPU to GPU. Two other bottlenecks are video memory related: geometry data memory limits (222), and texture data memory limits (223). There are two additional bottlenecks inside the GPU: transform bound (224) in the geometry subsystem, and fragment rendering (225) in pixel subsystem. These bottlenecks determine overall throughput. In general, the bottlenecks vary over the course of a graphics application.

In high-performance graphics applications, the number of computations required to render a 3D scene and produce high-resolution graphical projections, greatly exceeds the capabilities of systems employing a single GPU graphics subsystem. Consequently, the use of parallel graphics pipelines, and multiple graphics processing units (GPUs), have become the rule for high-performance graphics system architecture and design, in order to relieve the overload presented by the different bottlenecks associated with single GPU graphics subsystems.

In FIG. 2A, there is shown an advanced chipset (e.g. Bearlake by Intel) having two buses (107, 108) instead of one, and allowing the interconnection of two external graphics cards in parallel: primary card (105) and secondary card (104), to share the computation load associated with the 3D graphics rendering process. As shown, the display (106) is attached to the primary card (105). It is anticipated that even more advanced commercial chipsets with >2 busses will appear in the future, allowing the interconnection of more than two graphic cards.

As shown in FIG. 2B, the general software architecture of prior art graphic system (200) comprises: the graphics application (201), standard graphics library (202), and vendor's GPU driver (203). This graphic software environment resides in the "program space" of main memory (102) on the host computer system. As shown, the graphic application (201) runs in the program space, building up the 3D scene, typically as a data base of polygons, each polygon being represented as a set of vertices. The vertices and others components of these polygons are transferred to the graphic card(s) for rendering, and displayed as a 2D image, on the display screen.

In FIG. 2C, the structure of a GPU subsystem on the graphics card is shown as comprising: a video memory disposed external to the GPU, and two 3D engines: (i) a transform bound geometry subsystem (224) for processing 3D graphics primitives; and (ii) a fill bound pixel subsystem (225). The video memory shares its storage resources among geometry buffer (222), through which all geometric (i.e. polygonal) data is transferred to the commands buffer, texture buffers (223), and Frame Buffer FB (226).

As shown in FIG. 2C, the division of graphics data among GPUs reduces (i) the bottleneck (222) posed by the video memory footprint at each GPU, (ii) the transform bound processing bottleneck (224), and (iii) the fill bound processing bottleneck (225).

However, when using a multiple GPU graphics architecture of the type shown in FIGS. 2A through 2C, there is a need to distribute the computational workload associated with interactive parallel graphics rendering processes. To achieve this objective, two different kind of parallel rendering methods have been applied to PC-based dual GPU graphics systems of the kind illustrated in FIGS. 2A through 2C, namely: the Time Division Method of Parallel Graphics Rendering illustrated in FIG. 2D; and the Image Division Method of Parallel Graphics Rendering illustrated in FIG. 2E.

Notably, a third type of method of parallel graphics rendering, referred to as the Object Division Method, has been developed over the years and practived exclusively on complex computing platforms requiring complex and expensive hardware platforms for compositing the pixel output of the multiple graphics pipelines. The Object Division Method, illustrated in FIG. 3A, can be found applied on conventional graphics platforms of the kind shown in FIG. 3, as well as specialized graphics computing platforms as described in US Patent Application Publication No. US 2002/0015055, assigned to Silicon Graphics, Inc. (SGI), published on Feb. 7, 2002, and incorporated herein by reference.

While the differences between the Image, Frame and Object Division Methods of Parallel Graphics Rendering will be described below, it will be helpful to first briefly describe the five (5) basic stages or phases of the parallel rendering process, which all three such methods have in common, namely:

(1) the Decomposition Phase, wherein the 3D scene or object is analyzed and its corresponding graphics display list data and commands are assigned to particular graphics pipelines available on the parallel multiple GPU-based graphics platform;

(2) the Distribution Phase, wherein the graphics display list data and commands are distributed to particular available graphics pipelines determined during the Decomposition Phase;

(3) the Rendering Phase, wherein the geometry processing subsystem/engine and the pixel processing subsystem/engine along each graphics pipeline of the parallel graphics platform uses the graphics display list data and commands distributed to its pipeline, and transforms (i.e. projects, shades and colors) the display-list objects and bit-mapped textures into a subset of unstructured matrix of pixels;

(4) the Recomposition Phase, wherein the parallel graphics platform uses the multiple sets of pixel data generated by each graphics pipeline to synthesize (or compose) a final set of pixels that are representative of the 3D scene (taken along the specified viewing direction), and this final set of pixel data is then stored in a frame buffer; and (5) the Display Phase, wherein the final set of pixel data retreived from the frame buffer; and provided to the screen of the device of the system. As will be explained below with reference to FIGS. 3B through 3D, each of these methods of parallel graphics rendering has both advantages and disadvantages.

Image Division Method of Parallel Graphics Rendering

As illustrated in FIG. 2D, the Image Division (Sort-First) Method of Parallel Graphics Rendering distributes all graphics display list data and commands to each of the graphics pipelines, and decomposes the final view (i.e. projected 2D image) in Screen Space, so that, each graphical contributor (e.g. graphics pipeline and GPU) renders a 2D tile of the final view. This mode has a limited scalability due to the parallel overhead caused by objects rendered on multiple tiles. There are two image domain modes, all well known in prior art. They differ by the way the final image is divided among GPUs.

(1) The Split Frame Rendering mode divides up the screen among GPUs by continuous segments. e.g. two GPUs each one handles about one half of the screen. The exact division may change dynamically due to changing load across the screen image. This method is used in Nvidia's SLI™ multiple-GPU graphics product.

(2) Tiled Frame Rendering mode divides up the image into small tiles. Each GPU is assigned tiles that are spread out across the screen, contributing to good load balancing. This method is implemented by ATI's Crossfire™ multiple GPU graphics card solution.

In image division, the entire database is broadcast to each GPU for geometric processing. However, the processing load at each Pixel Subsystem is reduced to about 1/N. This way of parallelism relieves the fill bound bottleneck (225). Thus, the image division method ideally suits graphics applications requiring intensive pixel processing.

Time Division (DPlex) Method of Parallel Graphics Rendering

As illustrated in FIG. 2F, the Time Division (DPlex) Method of Parallel Graphics Rendering distributes all display list graphics data and commands associated with a first scene to the first graphics pipeline, and all graphics display list data and commands associated with a second/subsequent scene to the second graphics pipeline, so that each graphics pipeline (and its individual rendering node or GPU) handles the processing of a full, alternating image frame. Notably, while this method scales very well, the latency between user input and final display increases with scale, which is often irritating for the user. Each GPU is give extra time of N time frames (for N parallel GPUs) to process a frame. Referring to FIG. 3, the released bottlenecks are those of transform bound (224) at geometry subsystem, and fill bound (225) at pixel subsystem. Though, with large data sets, each GPU must access all of the data. This requires either maintaining multiple copies of large data sets or creating possible access conflicts to the source copy at the host swelling up the video memory bottlenecks (222, 223) and data transfer bottleneck (221).

Object Division (Sort-last) Method of Parallel Graphics Rendering

As illustrated in FIG. 3B, the Object Division (Sort-last) Method of Parallel Graphics Rendering decomposes the 3D scene (i.e. rendered database) and distributes graphics display list data and commands associated with a portion of the scene to the particular graphics pipeline (i.e. rendering unit), and recombines the partially rendered pixel frames, during recomposition. The geometric database is therefore shared among GPUs, offloading the geometry buffer and geometry subsystem, and even to some extend the pixel subsystem. The main concern is how to divide the data in order to keep load balance. An exemplary multiple-GPU platform of FIG. 3B for supporting the object-division method is shown in FIG. 3A. The platform requires complex and costly pixel compositing hardware which prevents its current application in a modern PC-based computer architecture.

Today, real-time graphics applications, such as advanced video games, are more demanding than ever, utilizing massive textures, abundance of polygons, high depth-complexity, anti-aliasing, multipass rendering, etc., with such robustness growing exponentially over time.

Clearly, conventional PC-based graphics system fail to address the dynamically changing needs of modern graphics applications. By their vary nature, prior art PC-based graphics systems are unable to resolve the variety of bottlenecks that dynamically arise along graphics applications. Consequently, such prior art graphics systems are often unable to maintain a high and steady level of performance throughout a particular graphics application.

Indeed, a given pipeline along a parallel graphics system is only as strong as the weakest link of it stages, and thus a single bottleneck determines the overall throughput along the graphics pipelines, resulting in unstable frame-rate, poor scalability, and poor performance.

While each parallelization mode described above solves only part of the bottleneck dilemma, currently existing along the PC-based graphics pipelines, no one parallelization method, in and of itself, is sufficient to resolve all bottlenecks in demanding graphics applications.

Thus, there is a great need in the art for a new and improved way of and means for practicing parallel 3D graphics rendering processes in modern multiple-GPU based computer graphics systems, while avoiding the shortcomings and drawbacks of such prior art methodologies and apparatus.

SUMMARY AND OBJECTS OF THE PRESENT INVENTION

Accordingly, a primary object of the present invention is to provide a new and improved method of and apparatus for practicing parallel 3D graphics rendering processes in modern multiple-GPU based computer graphics systems, while avoiding the shortcomings and drawbacks associated with prior art apparatus and methodologies.

Another object of the present invention is to provide such apparatus in the form of a multi-mode multiple graphics processing unit (GPU) based parallel graphics system having multiple graphics processing pipelines with multiple GPUs supporting a parallel graphics rendering process having time, frame and object division modes of operation, wherein each GPU comprises video memory, a geometry processing subsystem and a pixel processing subsystem, and wherein 3D scene profiling is performed in real-time, and the parallelization state/mode of the system is dynamically controlled to meet graphics application requirements.

Another object of the present invention is to provide a multi-mode parallel graphics rendering system having multiple graphics pipelines, each having a GPU and video memory, and supporting multiple modes of parallel graphics rendering using real-time graphics application profiling and configuration of the multiple graphics pipelines supporting multiple modes of parallel graphics rendering, namely, a time-division mode, a frame-division mode, and an object-division mode of parallel operation.

Another object of the present invention is to provide such a multi-mode parallel graphics rendering system, which is capable of dynamically handling bottlenecks that are automatically detected during any particular graphics application running on the host computing system.

Another object of the present invention is to provide such a multi-mode parallel graphics rendering system, wherein different parallelization schemes are employed to reduce pipeline bottlenecks, and increase graphics performance.

Another object of the present invention is to provide such a multi-mode parallel graphics rendering system, wherein image, time and object division methods of parallelization are implemented on the same parallel graphics platform.

Another object of the present invention is to provide a novel method of multi-mode parallel graphics rendering that can be practiced on a multiple GPU-based PC-level graphics system, and dynamically alternating among time, frame and object division modes of parallel operation, in real-time, during the course of graphics application, and adapting the optimal method to the real time needs of the graphics application.

Another object of the present invention is to provide such a multi-mode parallel graphics rendering system, which is capable of supervising the performance level of a graphic application by dynamically adapting different parallelization schemes to solve instantaneous bottlenecks along the graphic pipelines thereof.

Another object of the present invention is to provide such a multi-mode parallel graphics rendering system, having run time configuration flexibility for various parallel schemes to achieve the best parallel performance.

Another object of the present invention is to provide such a multi-mode parallel graphics rendering system having architectural flexibility and real-time profiling and control capabilities which enable utilization of different modes for high and steady performance along the application running on the associated host system.

Another object of the present invention is to provide a novel method of multi-mode parallel graphics rendering on a multiple GPU-based graphics system, which achieves improved system performance by using adaptive parallelization of multiple graphics processing units (GPUs), on conventional and non-conventional platform architectures, as well as on monolithic platforms, such as multiple GPU chips or integrated graphic devices (IGD).

Another object of the present invention is to provide a multi-mode parallel graphics rendering system, wherein bottlenecks are dynamically handled.

Another object of the present invention is to provide such a multi-mode parallel graphics rendering system, wherein stable performance is maintained throughout course of a graphics application.

Another object of the present invention to provide a multi-mode parallel graphics rendering system supporting software-based adaptive graphics parallelism for the best performance, seamlessly to the graphics application, and compliant with graphic standards (e.g. OpenGL and Direct3D).

Another object of the present invention is to provide a multi-mode parallel graphics rendering system, wherein all parallel modes are implemented in a single architecture.

Another object of the present invention is to provide a multi-mode parallel graphics rendering system, wherein the architecture is flexible, supporting fast inter-mode transitions.

Another object of the present invention is to provide a multi-mode parallel graphics rendering system which is adaptive to changing to meet the needs of any graphics application during the course of its operation.

Another object of the present invention is to provide a multi-mode parallel graphics rendering system, which can be implemented using a software implementation of present invention.

Another object of the present invention is to provide a multi-mode parallel graphics rendering system, which can be realized using a hardware implementation.

Another object of the present invention is to provide a multi-mode parallel graphics rendering system, can be realized as chip implementation.

Another object of the present invention is to provide a multi-mode parallel graphics rendering system, which can be realized as an integrated monolithic implementation.

Another object of the present invention is to provide a multi-mode parallel graphics rendering system, which can be implemented using IGD technology.

Another object of the present invention is to provide a multi-mode parallel graphics rendering system, characterized by run-time configuration flexibility for various parallel schemes to achieve the best parallel performance.

Another object of the present invention is to provide a multi-mode parallel graphics rendering system which operates seamlessly to the application and is compliant with graphic standards (e.g. OpenGL and Direct3D).

Another object of the present invention is to provide a multi-mode parallel graphics rendering system, which can be implemented on conventional multi-GPU platforms replacing image division or time division parallelism (e.g. SLI by Nvidia).

Another object of the present invention is to provide a multi-mode parallel graphics rendering system, which enables the multiple GPU platform vendors to incorporate the solution in their systems supporting only image division and time division modes of operation.

Another object of the present invention is to provide such multiple GPU-based graphics system, which enables implementation using low cost multi-GPU cards.

Another object of the present invention is to provide a multi-mode parallel graphics rendering system implemented using IGD technology, and wherein it is impossible for the IGD to get disconnected by the BIOS when an external graphics card is connected and operating.

Another object of the present invention is to provide a multiple GPU-based graphics system, wherein a new method of dynamically controlled parallelism improves the system's efficiency and performance.

Another object of the present invention is to provide a multi-mode parallel graphics rendering system, which can be implemented using an IGD supporting more than one external GPU.

Another object of the present invention is to provide a multi-mode parallel graphics rendering system, which can be implemented using an IGD-based chipset having two or more IGDs.

These and other objects of the present invention will become apparent hereinafter and in the claims to invention.

BRIEF DESCRIPTION OF DRAWINGS OF PRESENT INVENTION

For a more complete understanding of how to practice the Objects of the Present Invention, the following Detailed Description of the Illustrative Embodiments can be read in conjunction with the accompanying Drawings, briefly described below:

FIG. 1A is a graphical representation of a typical prior art PC-based computing system employing a conventional graphics architecture driving a single external graphic card (105);

FIG. 1B a graphical representation of a conventional GPU subsystem supported on the graphics card of the PC-based graphics system of FIG. 1A;

Figure 1A:
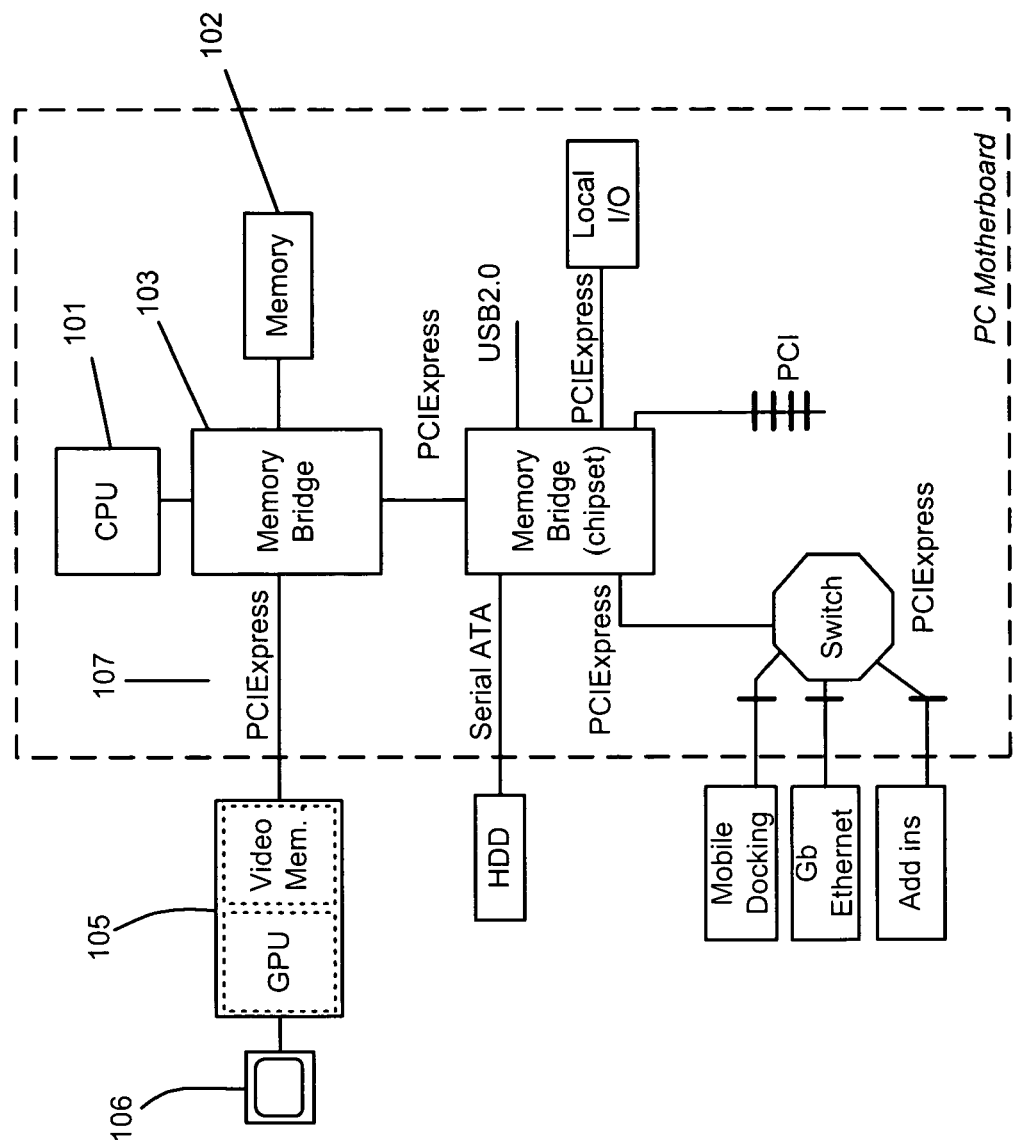
FIG. 1C is a graphical representation of a conventional method rendering successive 3D scenes using single GPU graphics platform.
Figure 1B:
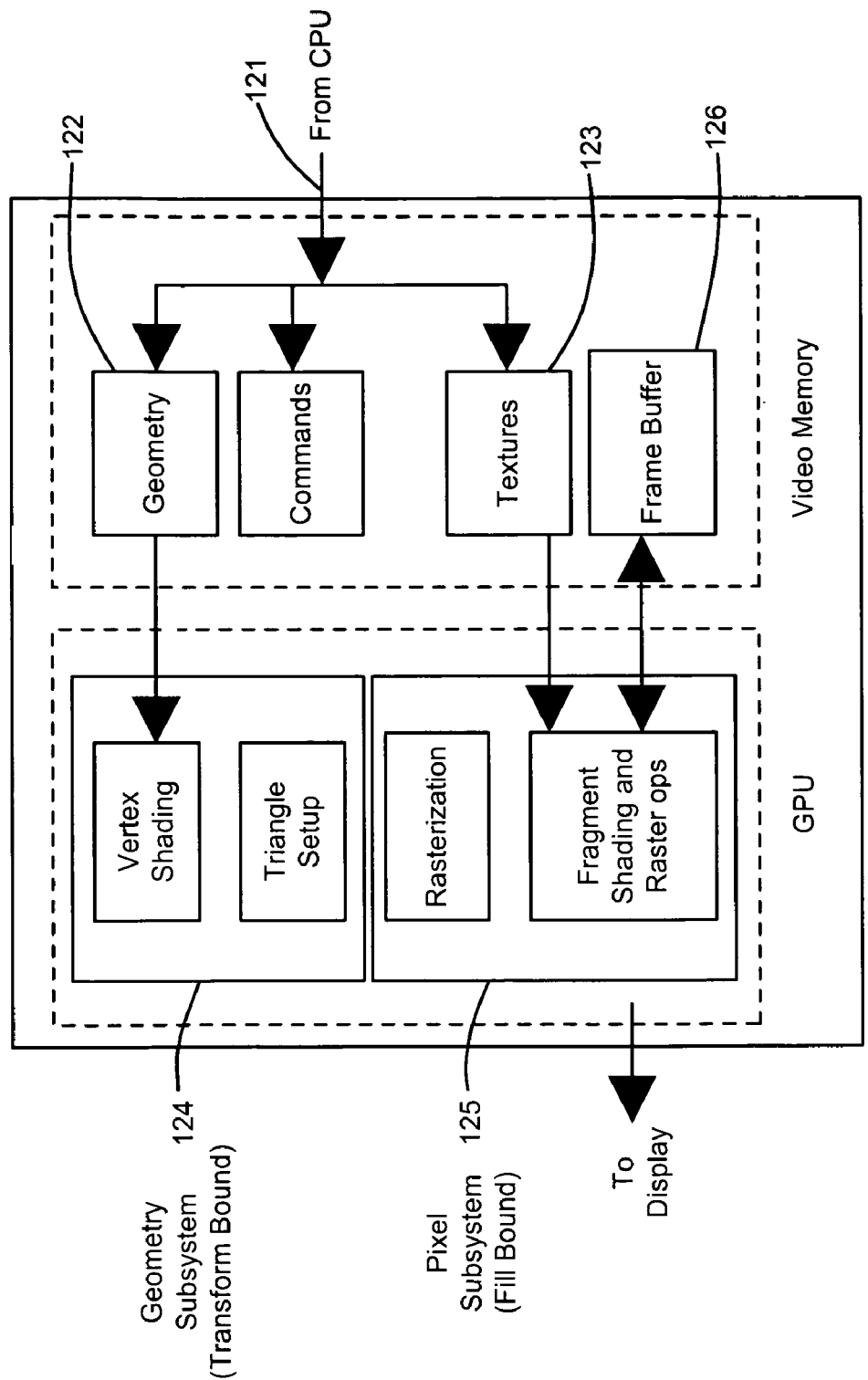
Figure 1C:
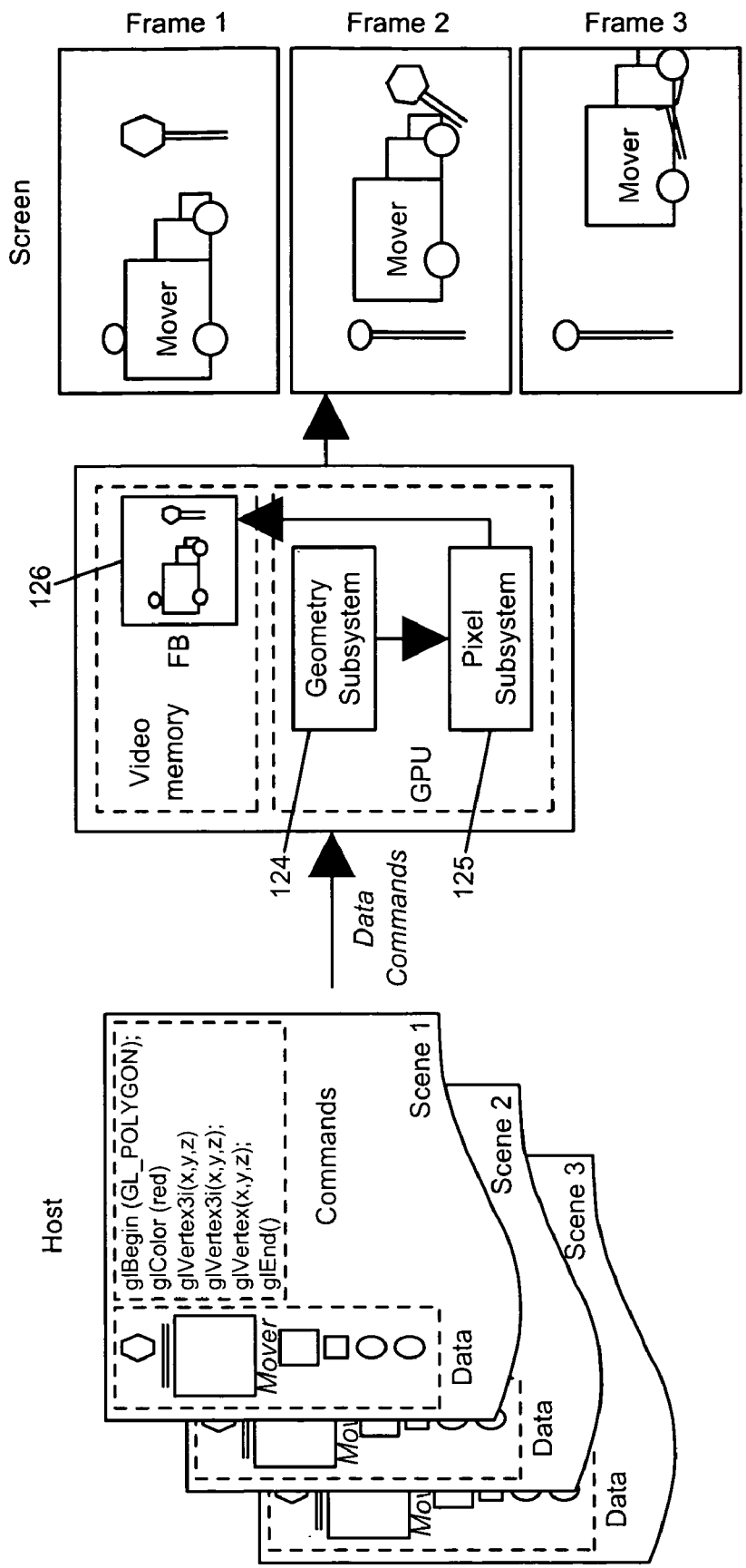
Figure 2A:
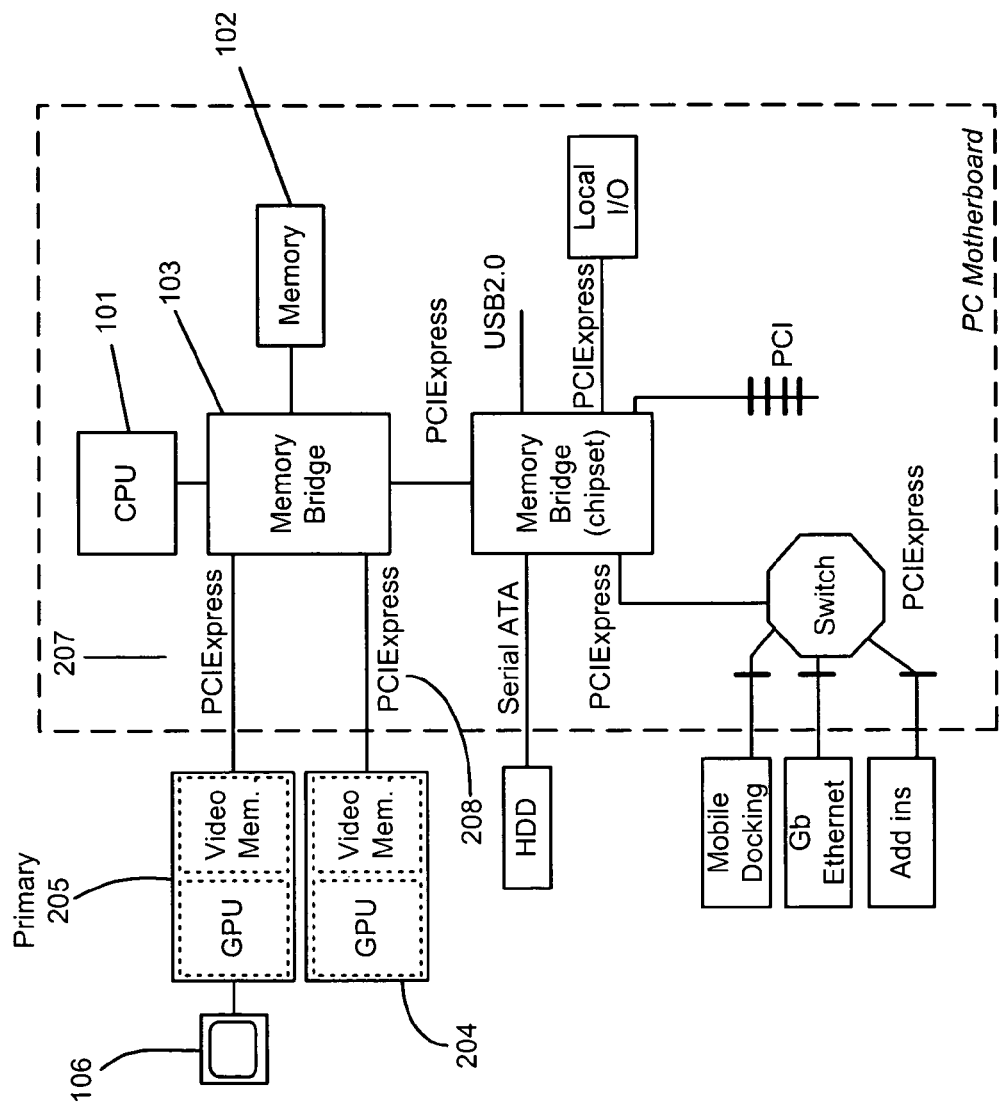
FIG. 2A is a graphical representation of a typical prior art PC-based computing system employing a conventional dual-GPU graphic architecture comprising two external graphic cards (i.e. primary (105) and secondary (107) graphics cards) connected to the host computer, and a display device (106) attached to the primary graphics card.
Figure 2B:
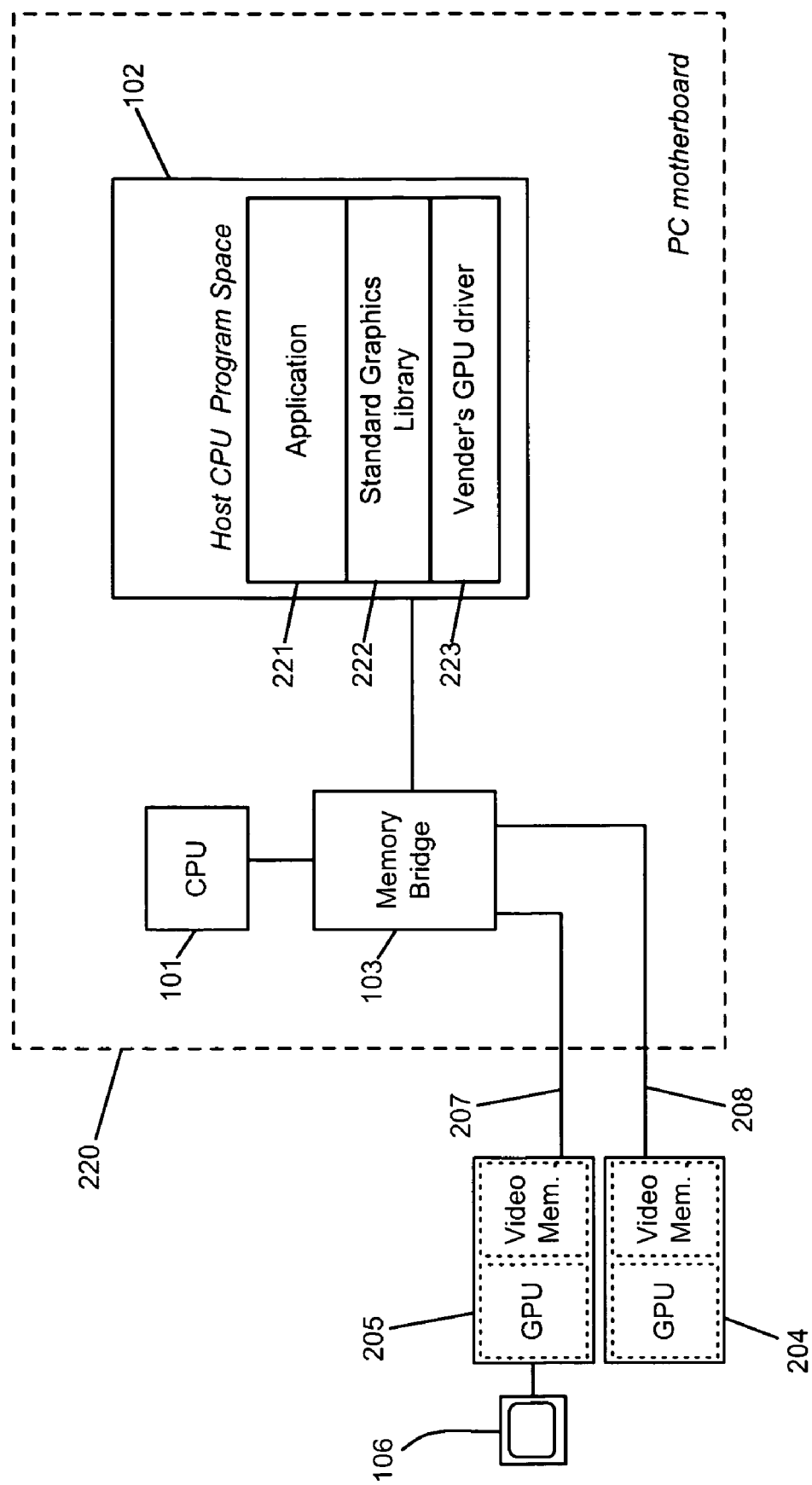
FIG. 2B is a graphical representation illustrating the general software architecture of the prior art PC-based graphics system shown in FIG. 2A.
Figure 2C:
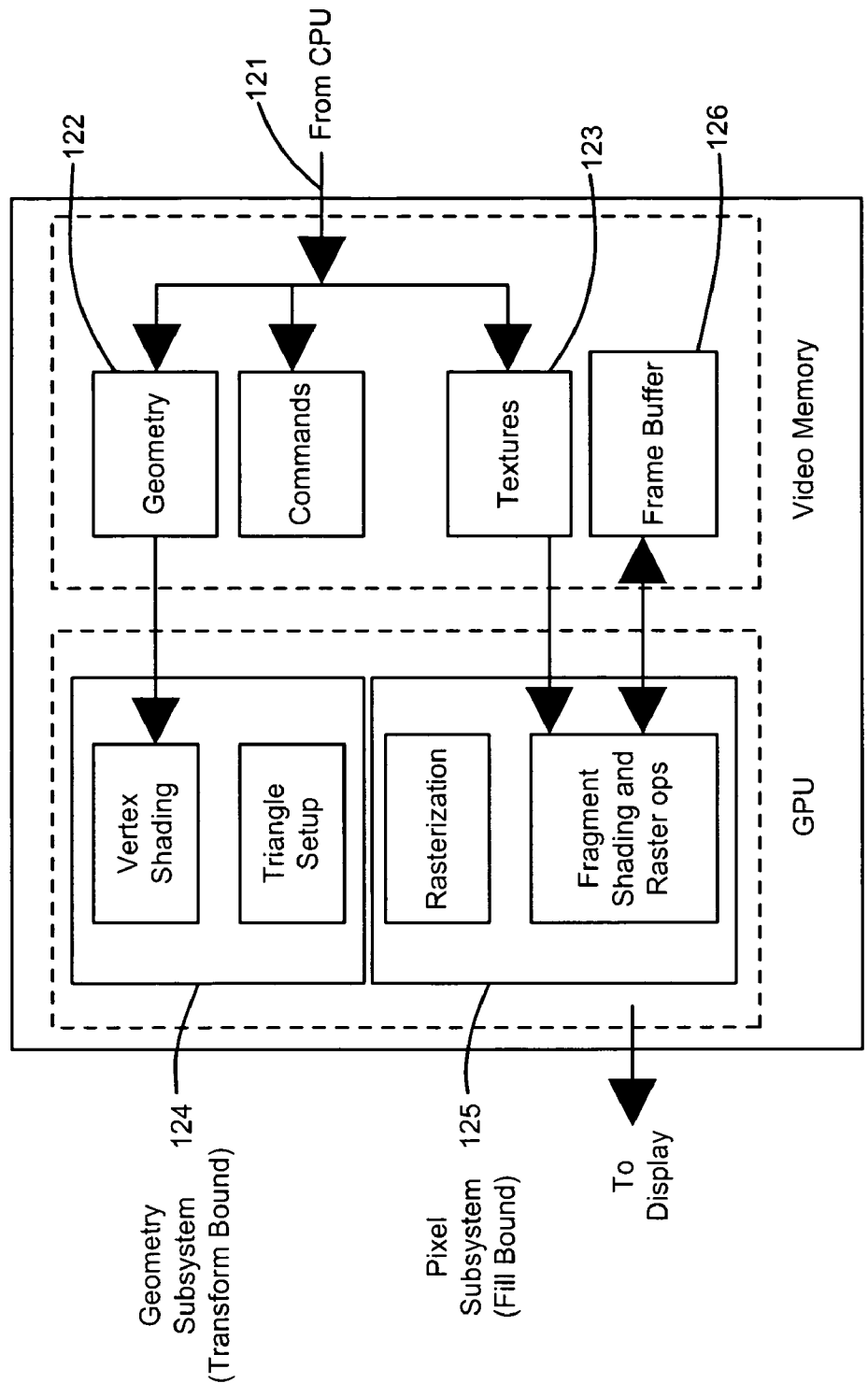
Figure 2D:
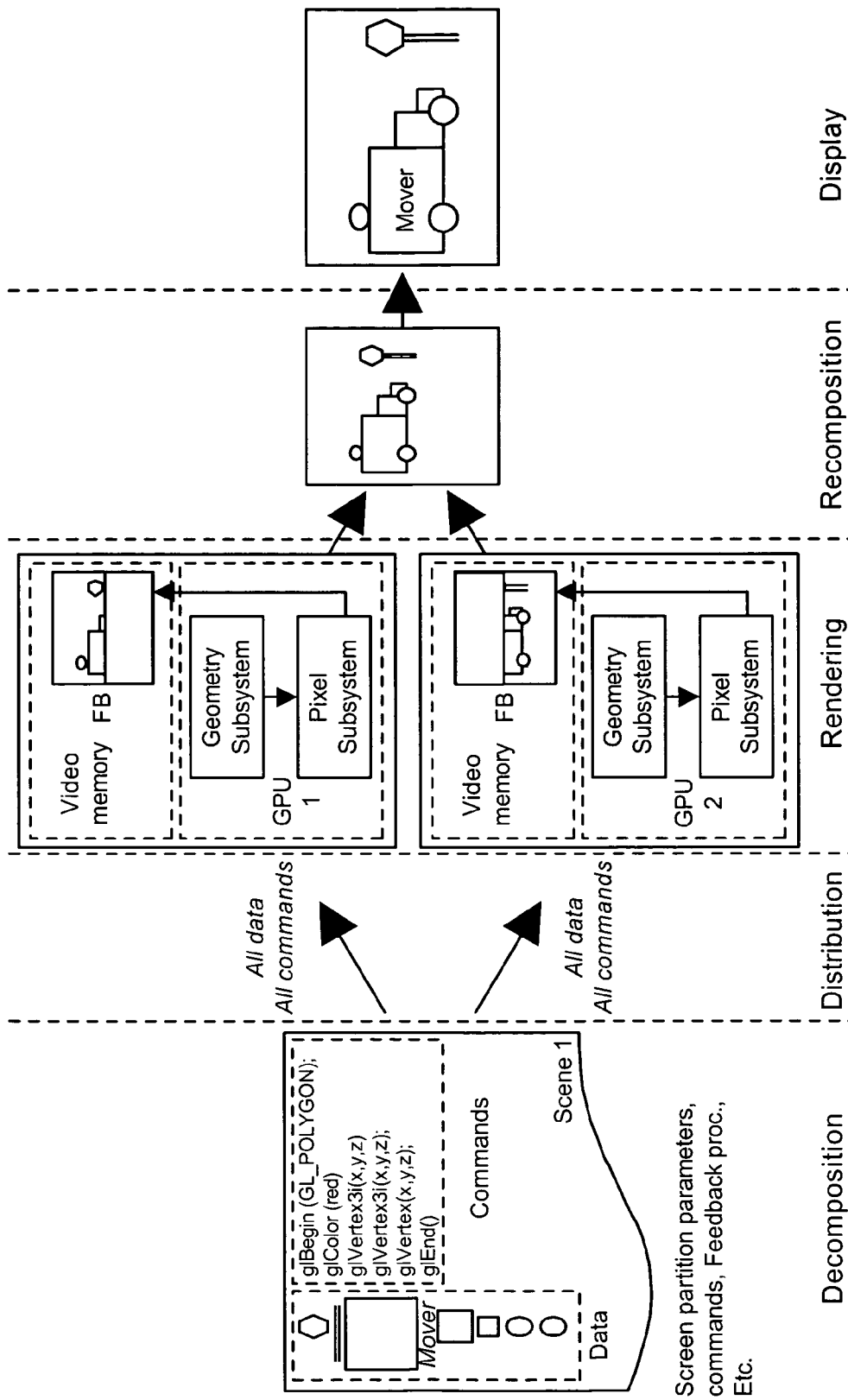
Figure 3A:
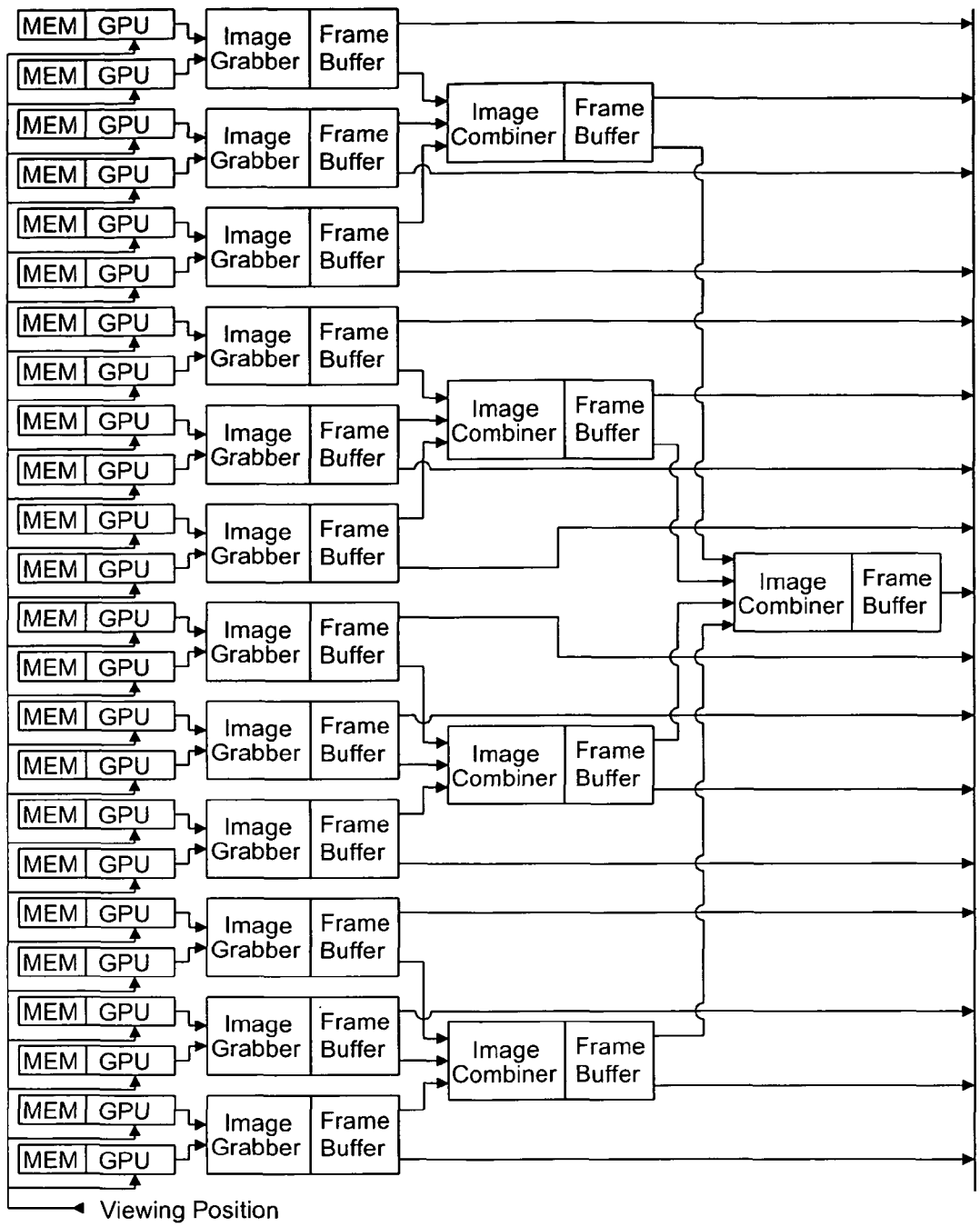
Figure 3B:
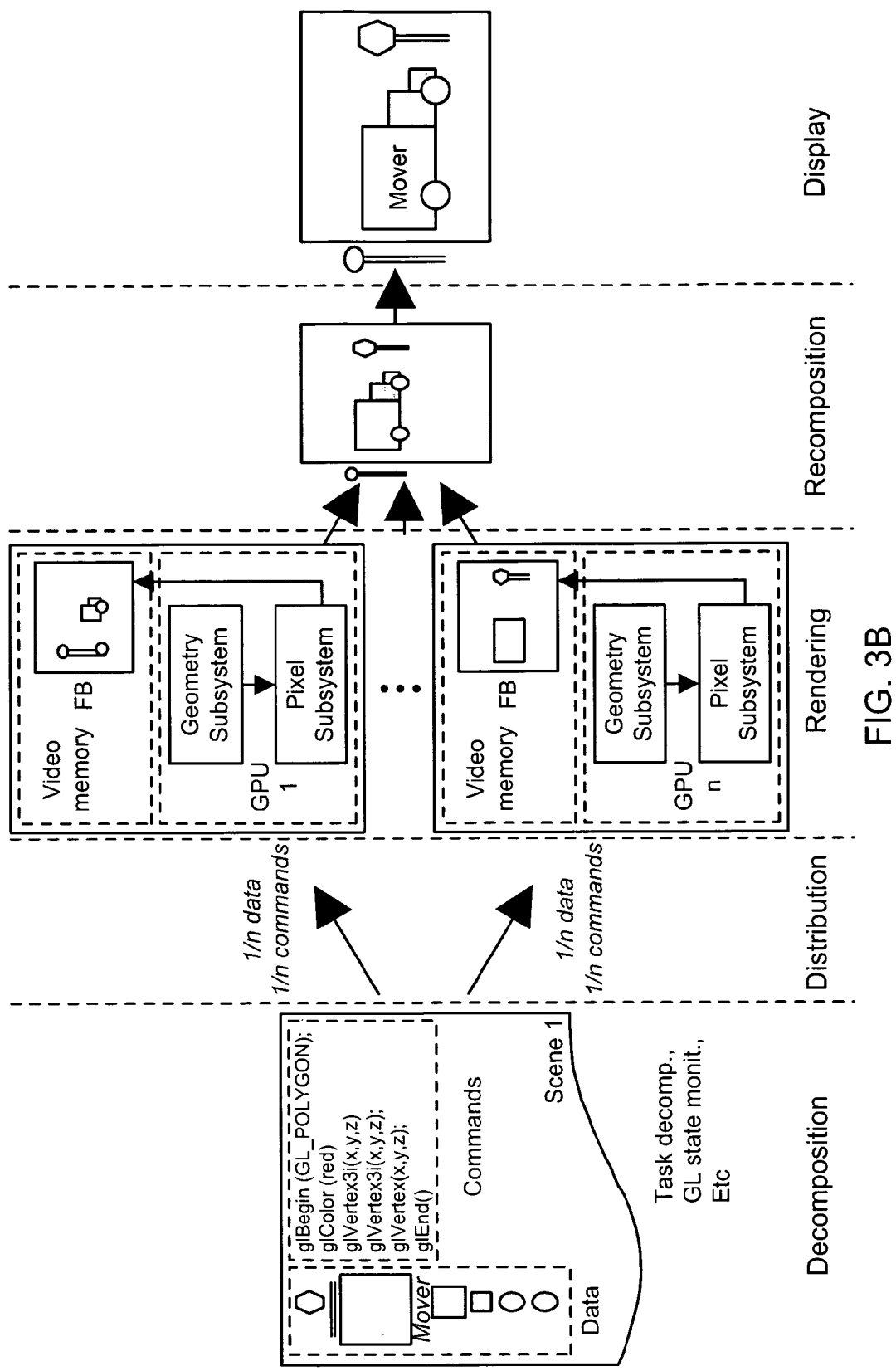
Figure 4A:
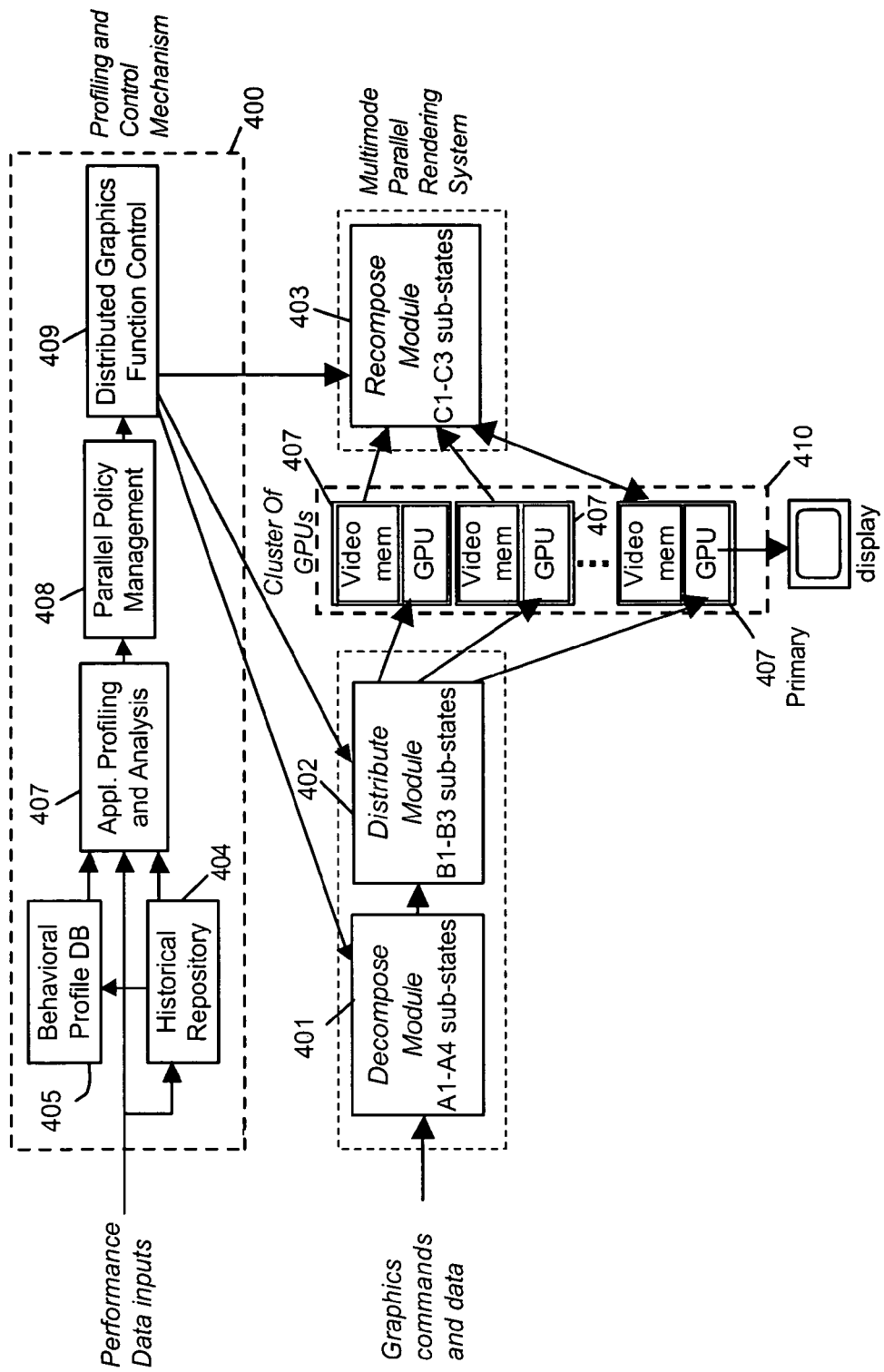
Figure 4B:
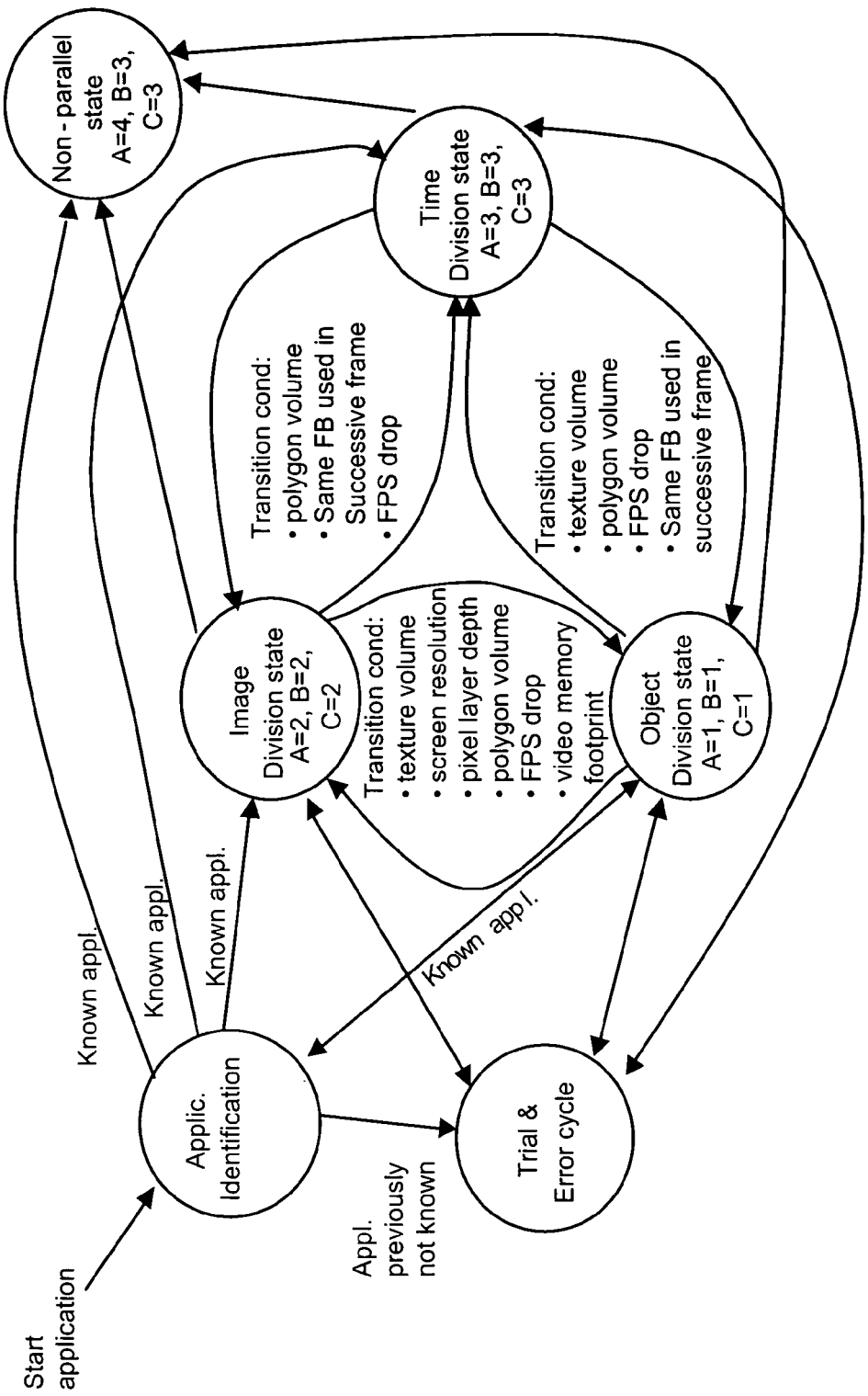
Figure 5A:
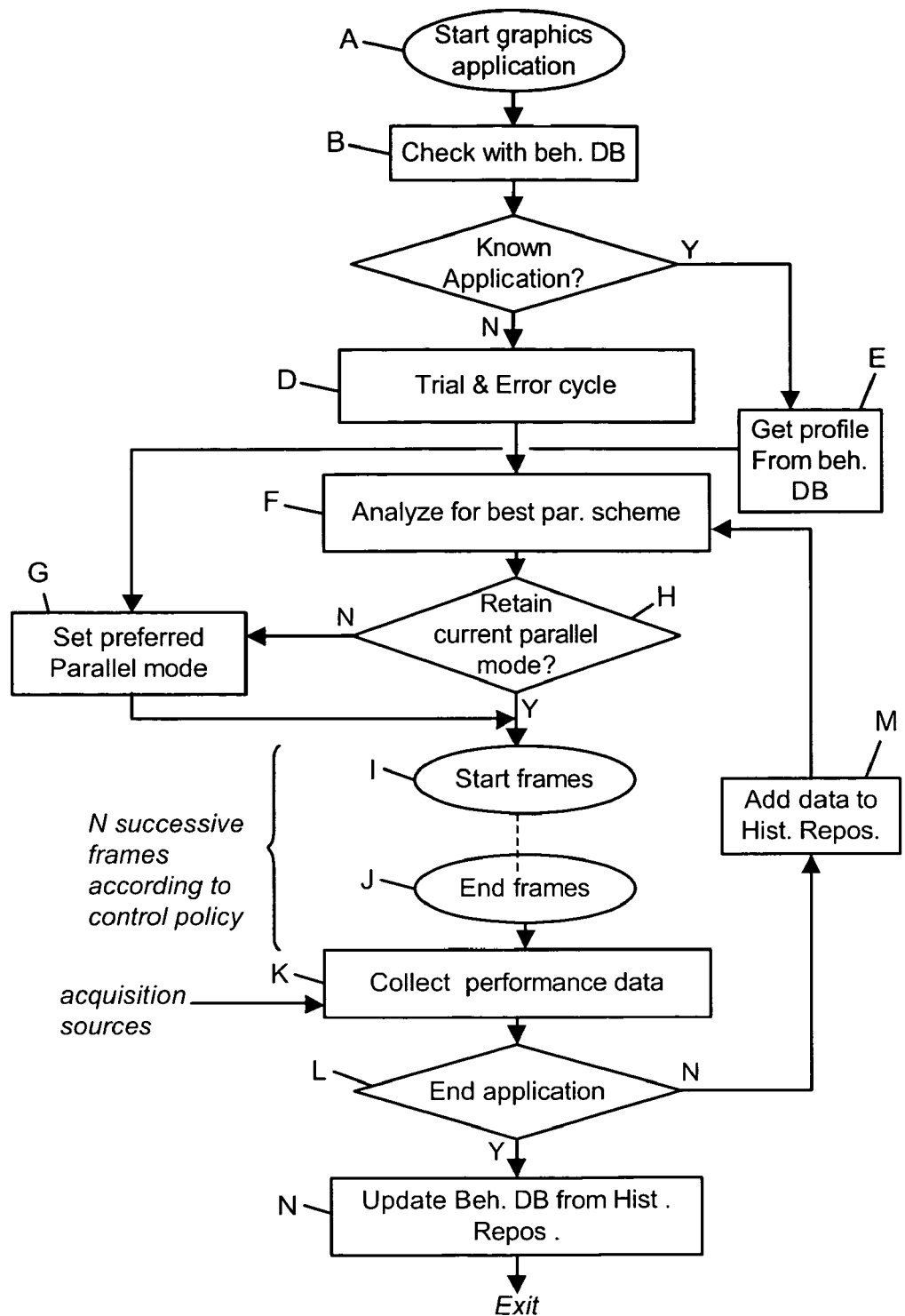
Figure 5B:
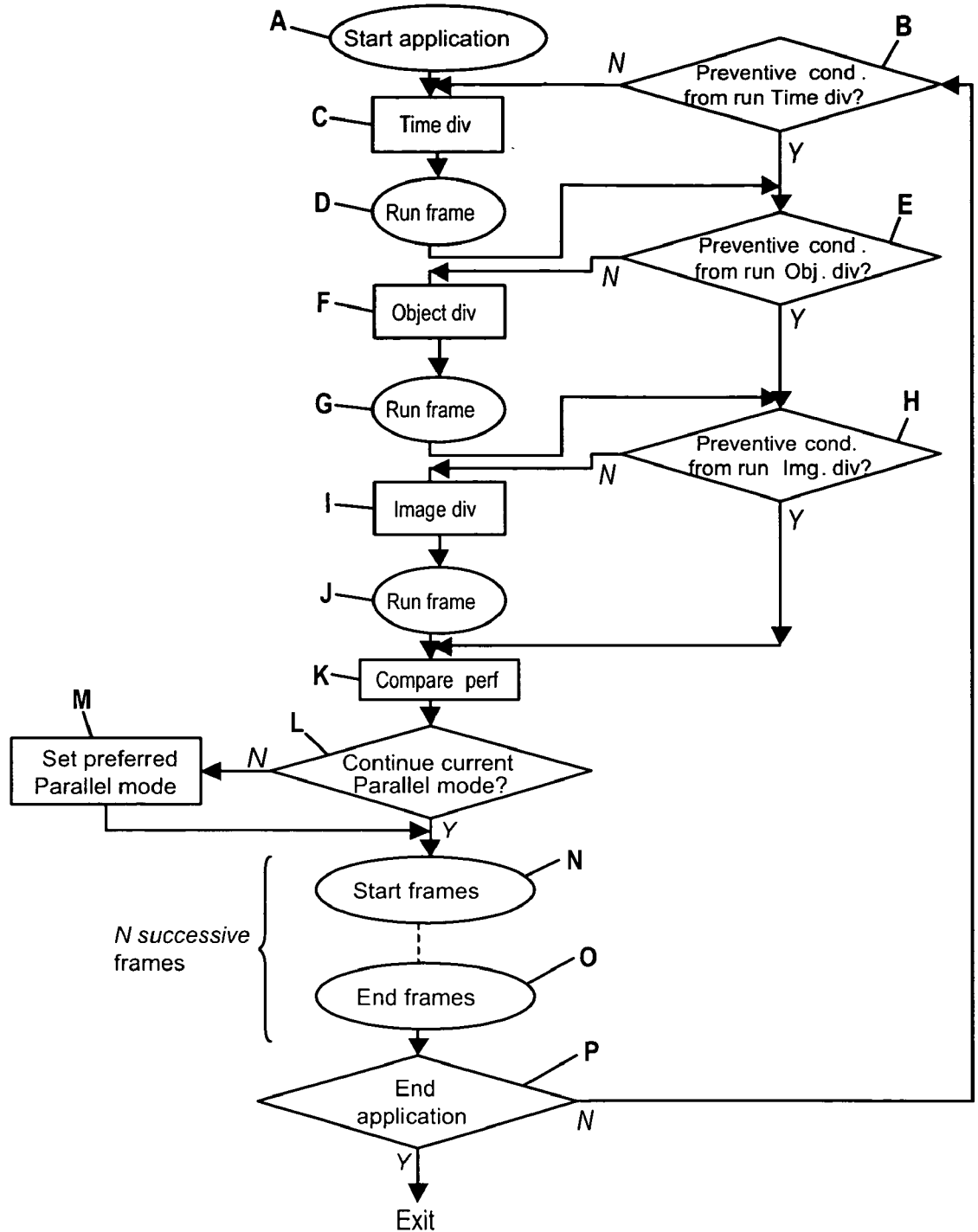
Figure 5C:
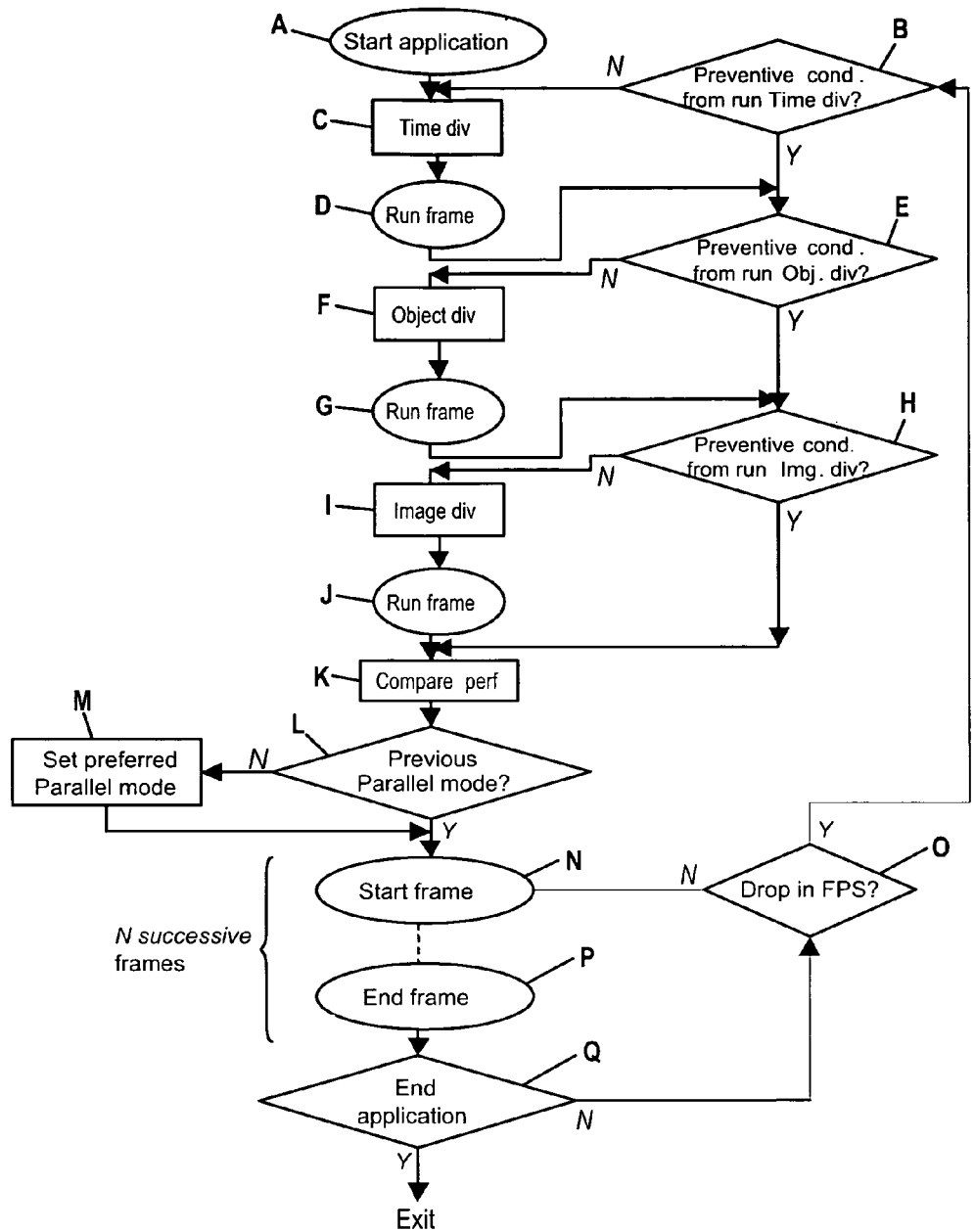
Figure 5D:
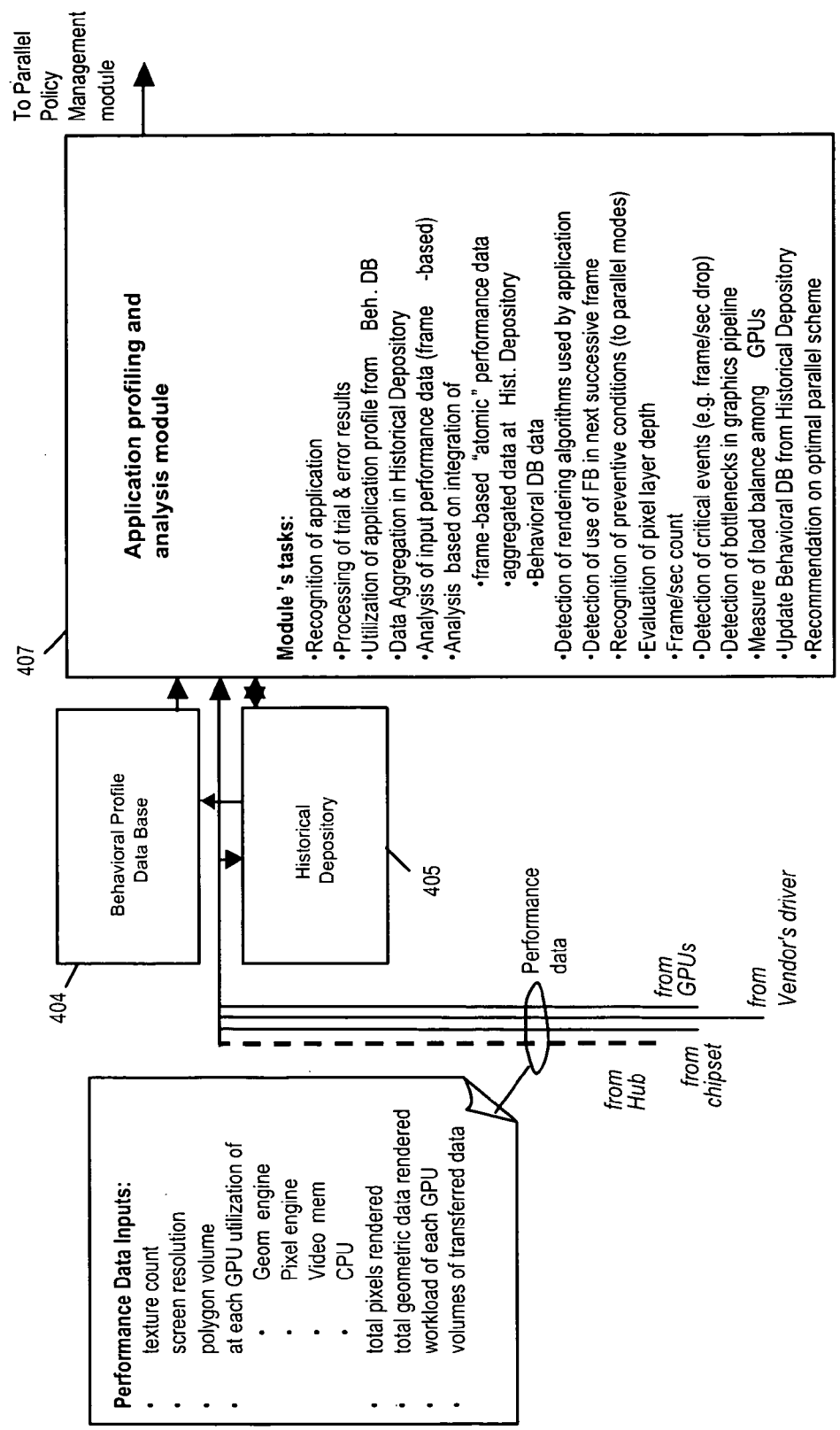
Figure 6A:
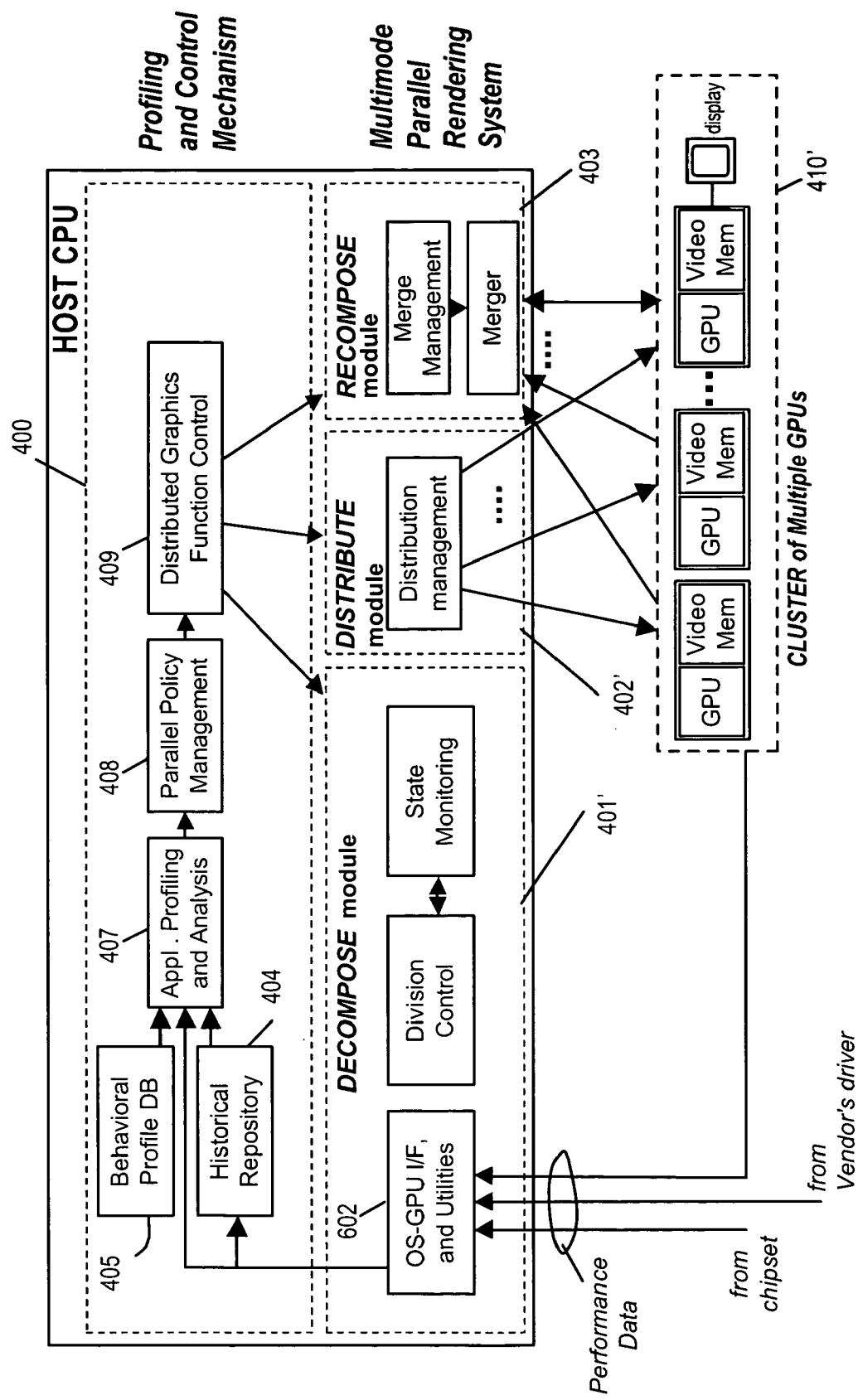
Figure 6B:
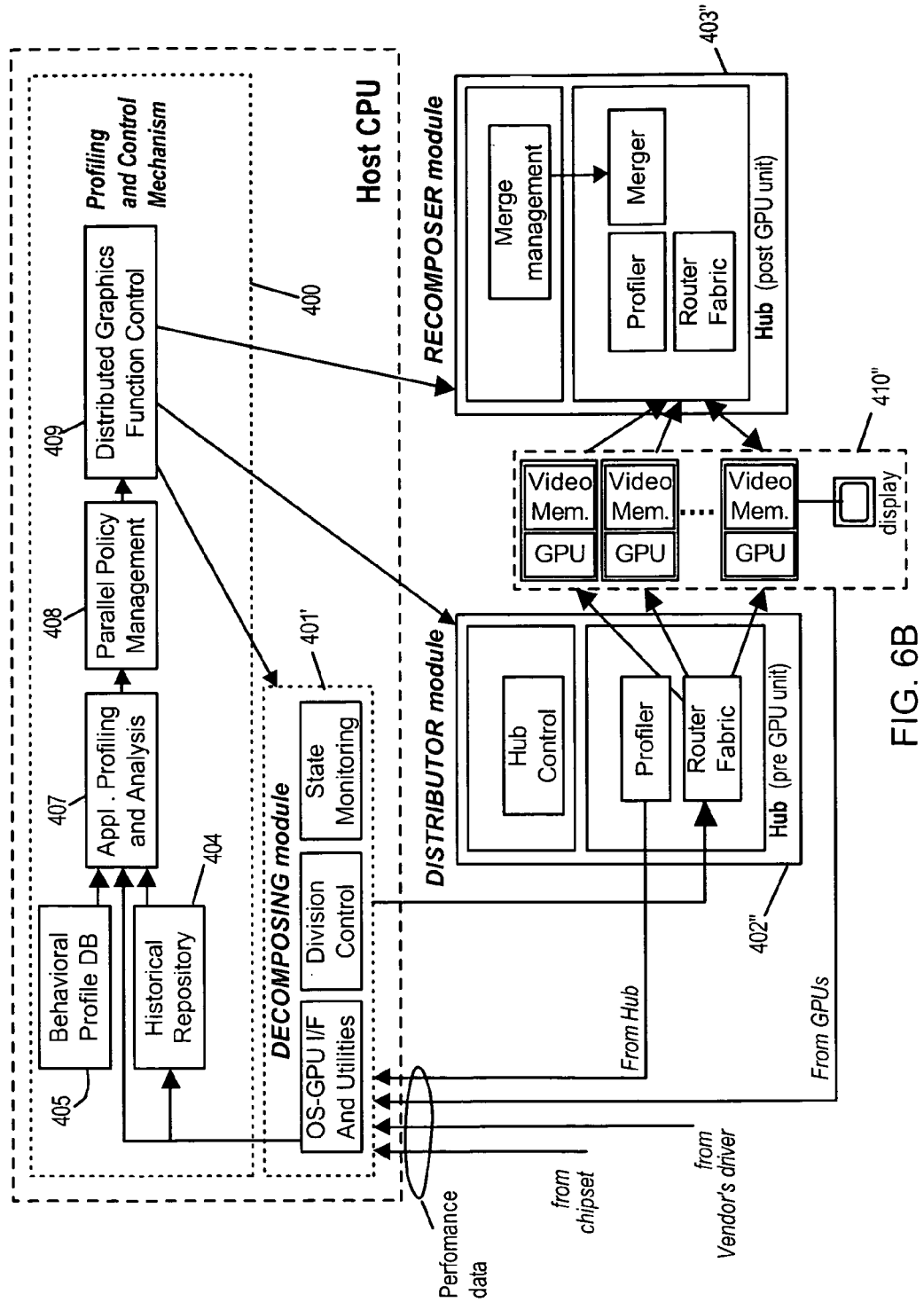
Figure 7A:
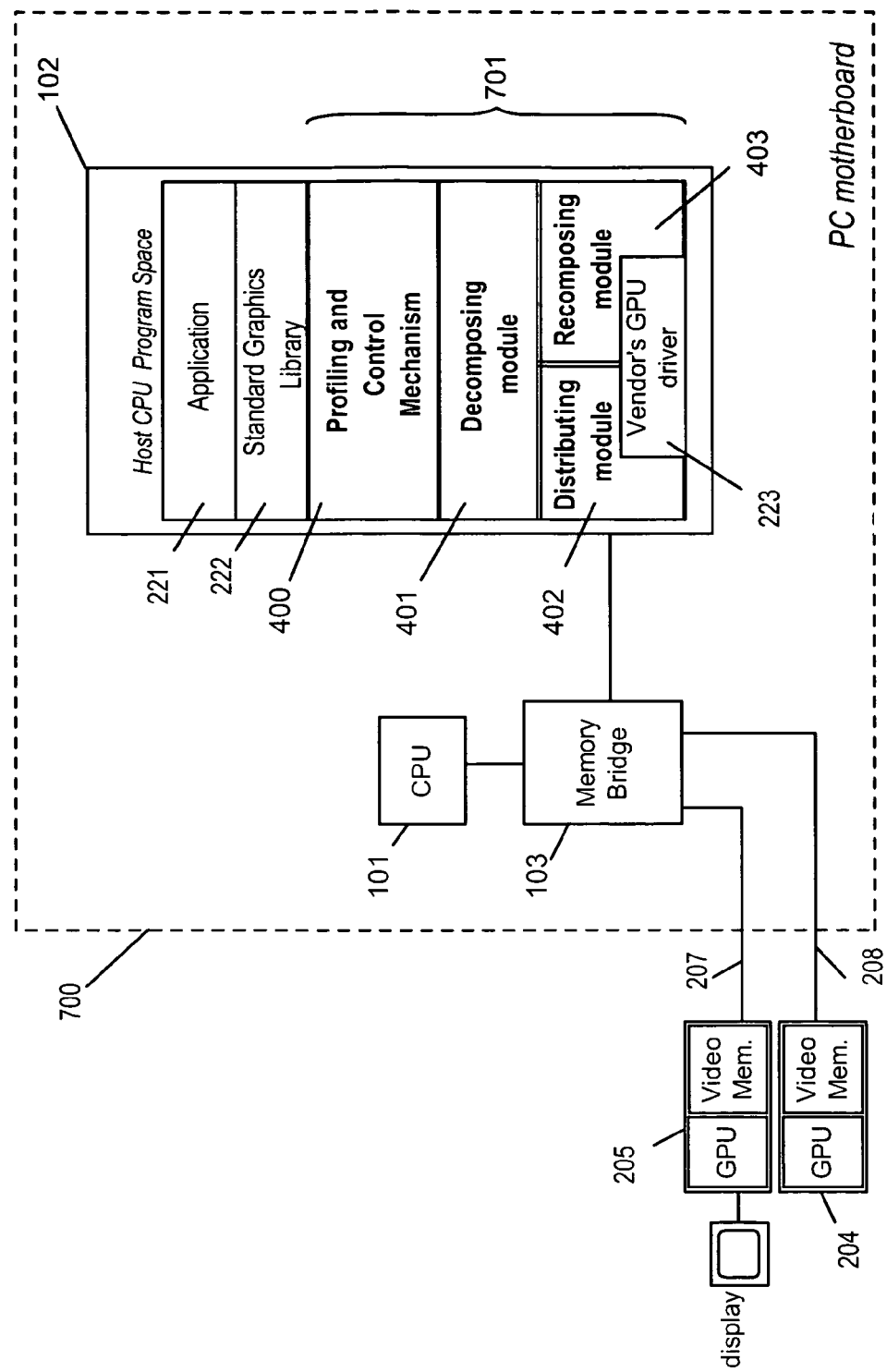

FIG. 2C a graphical representation of a conventional GPU subsystem supported on each of the graphics cards employed in the prior art PC-based computing system of FIG. 2A;

FIG. 2D is a graphical representation of a conventional parallel graphics rendering process being carried out according to the Time Division Method of parallelism using the dual GPUs provided on the prior art graphics platform illustrated in FIGS. 2A through 2C;

FIG. 2E is a graphical representation of a conventional parallel graphics rendering process being carried out according to the Image Division Method of parallelism using the dual GPUs provided on the prior art graphics platform illustrated in FIGS. 2A through 2C;

FIG. 3A is a schematic representation of a prior art parallel graphics platform comprising multiple parallel graphics pipelines, each supporting video memory and a GPU, and feeding complex pixel compositing hardware for composing a final pixel-based image for display on the display device;

FIG. 3B is a graphical representation of a conventional parallel graphics rendering process being carried out according to the Object Division Method of parallelism using multiple GPUs on the prior art graphics platform of FIG. 3A;

FIG. 4A is a schematic representation of the multi-mode parallel 3D graphics rendering system of present invention employing automatic 3D scene profiling and multiple GPU and state control, wherein the system supports three primary parallelization stages, namely, Decompose (401), Distribute (402) and Recompose (403), and wherein each stage is configured (i.e. set up) into a sub-state by set of parameters A for 401, B for 402, and C for 403, and wherein the "Parallelism State" for the overall parallel graphics system is established or determined by the combination of sub-states of these component stages;

FIG. 4A1 is a schematic representation for the Mode Definition Table which shows the four combinations of sub-modes A:B:C for realizing the three Parallel Modes of the parallel graphics system of the present invention, and its one Single (GPU) (Non-Parallel Functioning) Mode of the system of present invention, if needed;

FIG. 4B is a State Transition Diagram for the multi-mode parallel 3D graphics rendering system of present invention, illustrating that a parallel state is characterized by A, B, C sub-state parameters, that the non-parallel state (single GPU) is an exceptional state, reachable from any state by a graphics application or PCM requirement, and that all state transitions in the system are controlled by Profiling and Control Mechanism (PCM), wherein in those cases of known and previously analyzed graphics applications, the PCM, when triggered by events (e.g. drop of FPS), automatically consults the Behavioral Database in course of application, or otherwise, makes decisions which are supported by continuous profiling and analysis of listed parameters, and/or trial and error event driven or periodical cycles;

FIG. 5A is a schematic representation of process carried out by the Profiling and Control Cycle in the Profiling and Control Mechanism employed in the multi-mode parallel 3D graphics rendering system of present invention, shown in FIG. 4A;

FIG. 5B is a schematic representation of process carried out by the Periodical Trial & Error Based Control Cycle in the Profiling and Control Mechanism employed in the multi-mode parallel 3D graphics rendering system of present invention, shown in FIG. 4A;

FIG. 5C is a schematic representation of process carried out by the Event Driven Trial & Error Control Cycle in the Profiling and Control Mechanism employed in the multi-mode parallel 3D graphics rendering system of present invention, shown in FIG. 4A;

FIG. 5D is a schematic representation showing the various inputs into, and tasks of the Application Profiling and Analysis Module within the Profiling and Control Mechanism employed in the multi-mode parallel 3D graphics rendering system of present invention, shown in FIG. 4A;

FIG. 6A is a schematic block representation of a general software-based architecture of the multi-mode parallel 3D graphics rendering system of present invention depicted in FIG. 4A, and illustrating the Profiling and Control Mechanism (400) supervising the flexible parallel rendering structure which enables the real-time adaptive, multi-mode parallel 3D graphics rendering system of present invention;

FIG. 6B is a schematic block representation of a general hardware-based architecture of the multi-mode parallel 3D graphics rendering system of present invention depicted in FIG. 4A, and illustrating the Profiling and Control Mechanism (400) that supervising the flexible Hub-based parallel rendering structure which enables the real-time adaptive, multi-mode parallel 3D graphics rendering system of present invention;

FIG. 7A is a schematic block representation of an illustrative software-based architecture of the multi-mode parallel 3D graphics rendering system of present invention (700), employing two GPUs and software package (701) comprising the Profiling and Control Mechanism (400) and a suit of three parallelism driving the software-based Decomposing Module (401'), Distributing Module (402') and Recomposing Module (403').

Figure 7B:
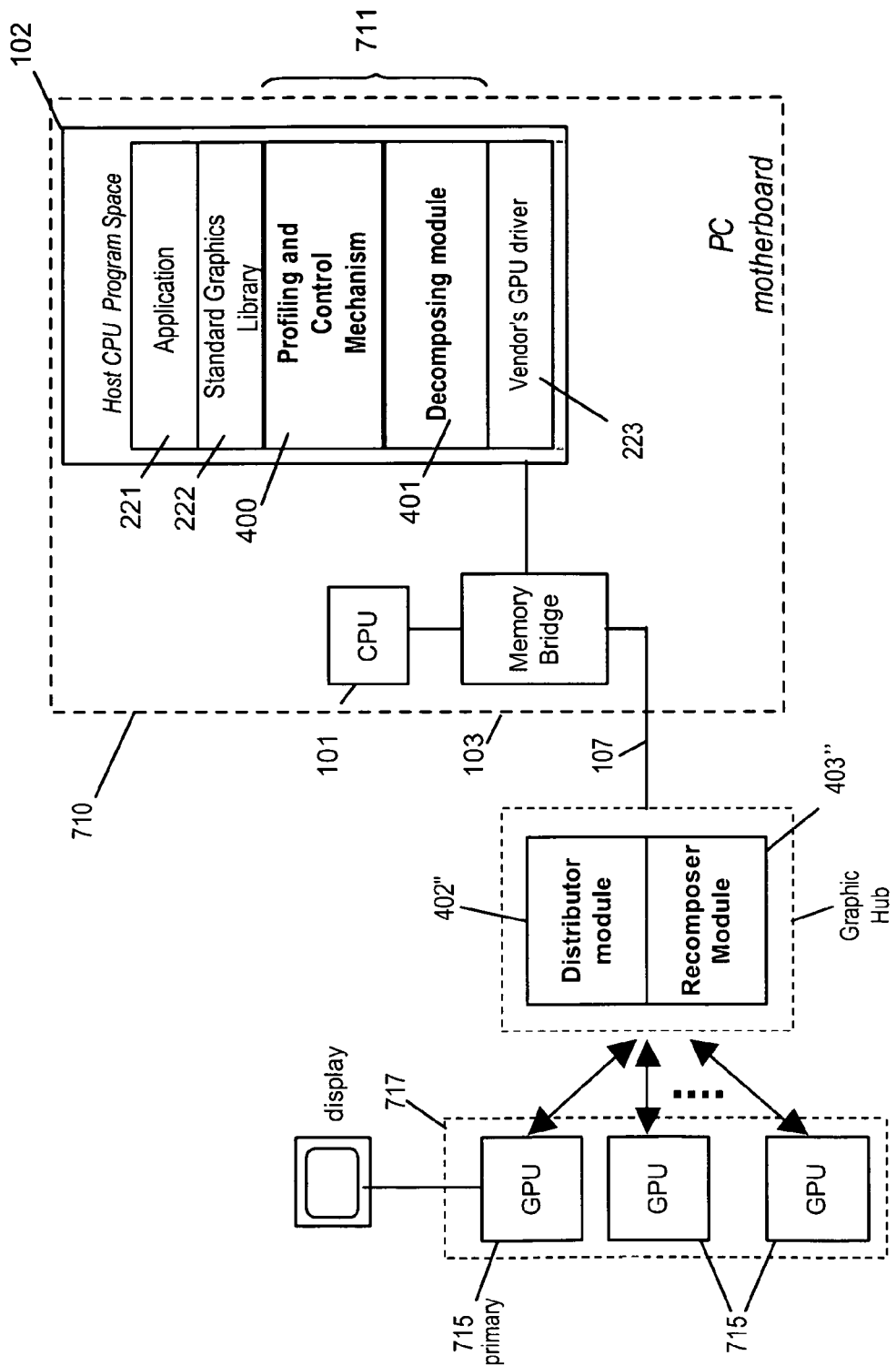
Figure 8F:
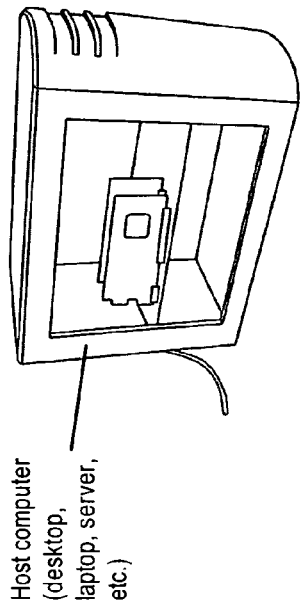
Figure 8G:
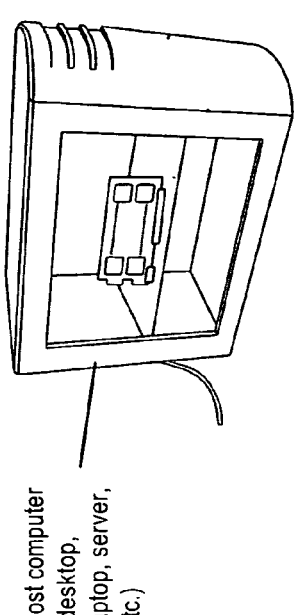
Figure 8H:
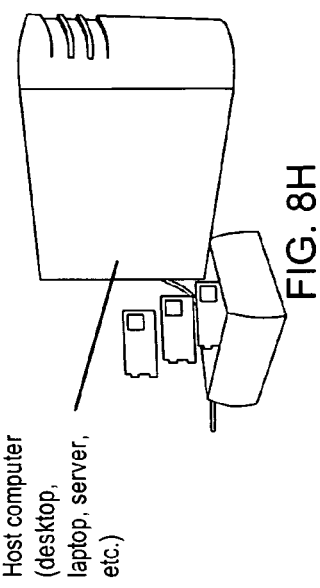
Figure 8E:
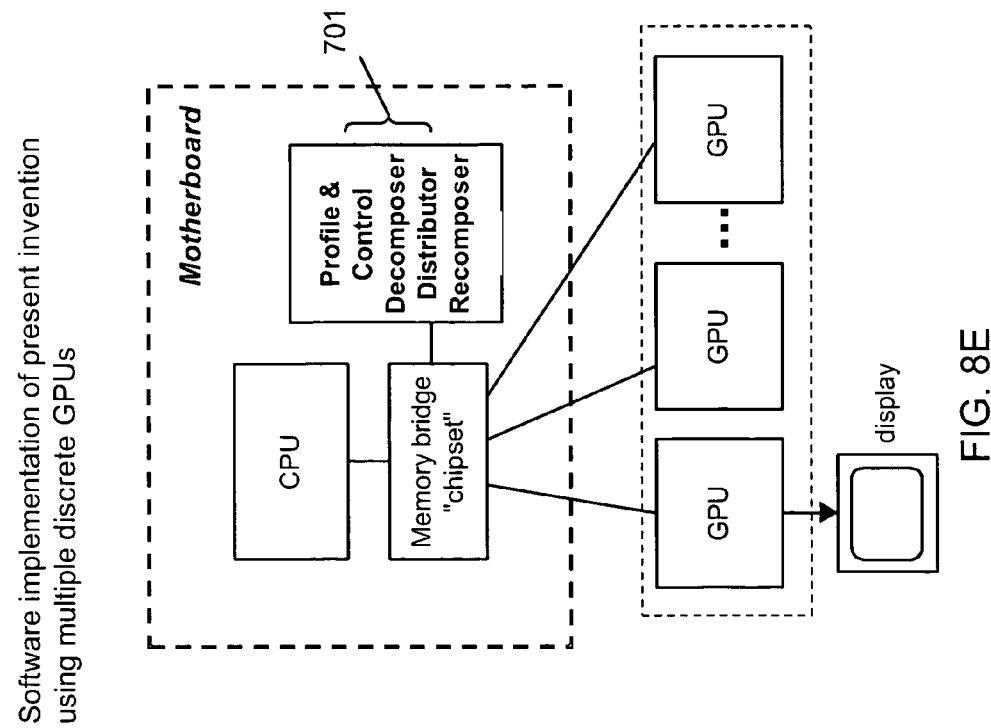
Figures 10A, 10B:
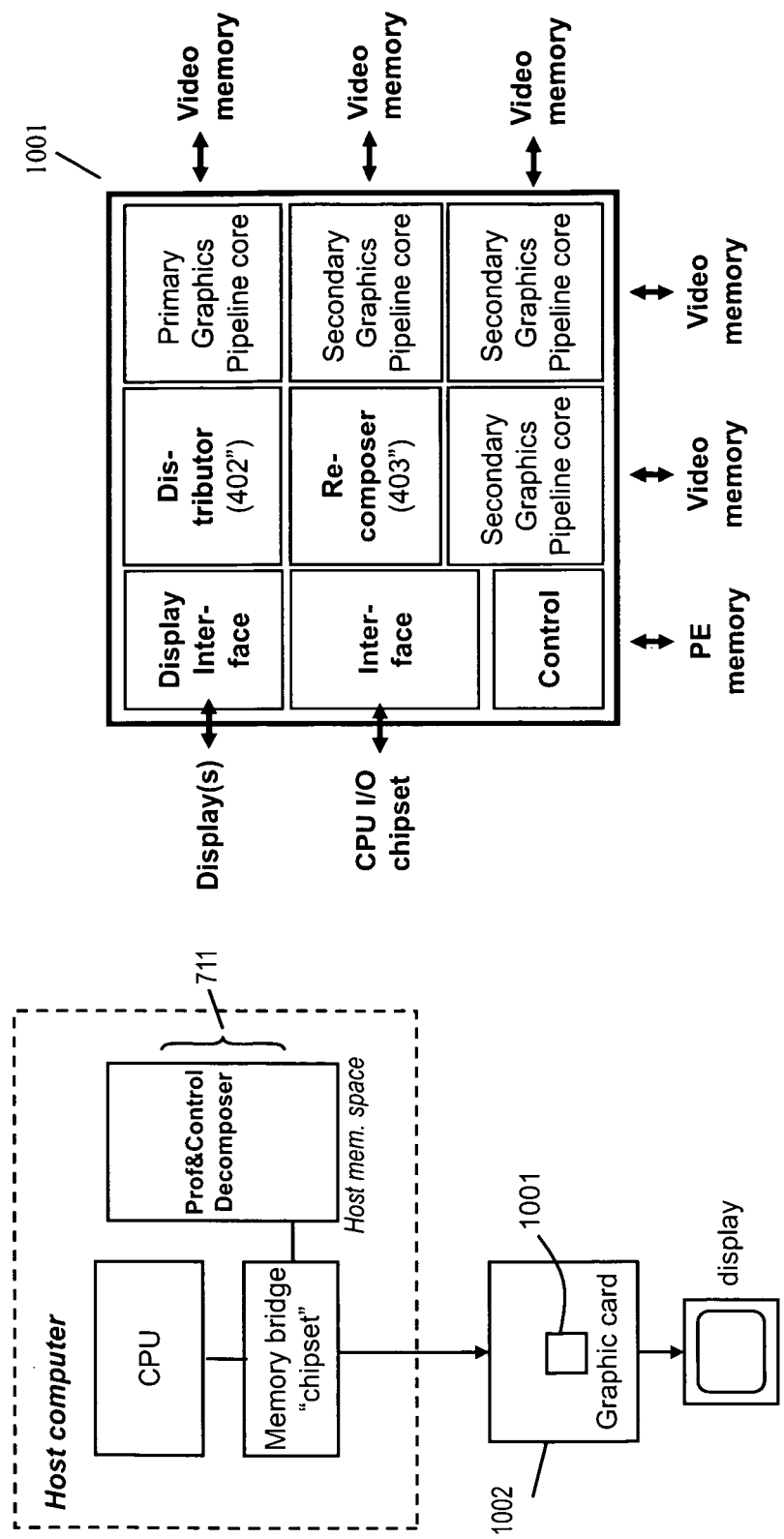
Figure 10C:
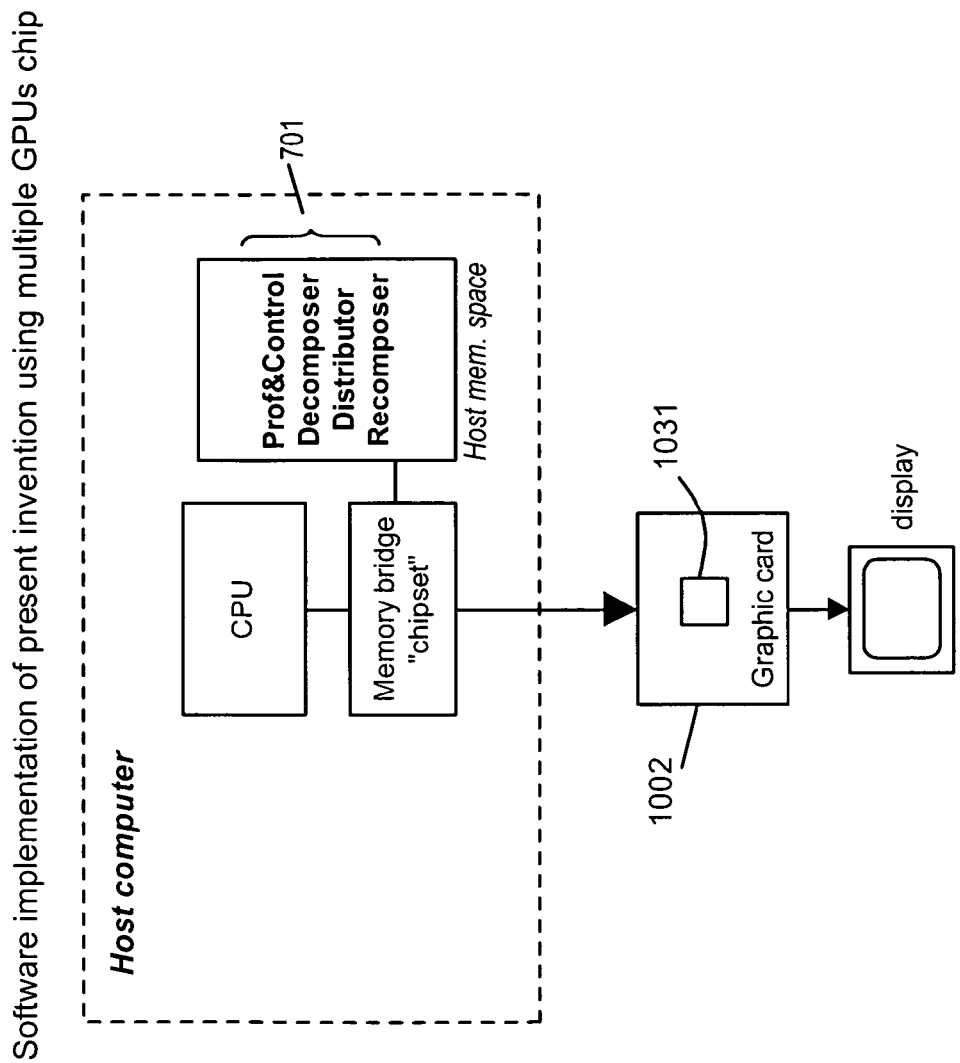
Figure 11A:
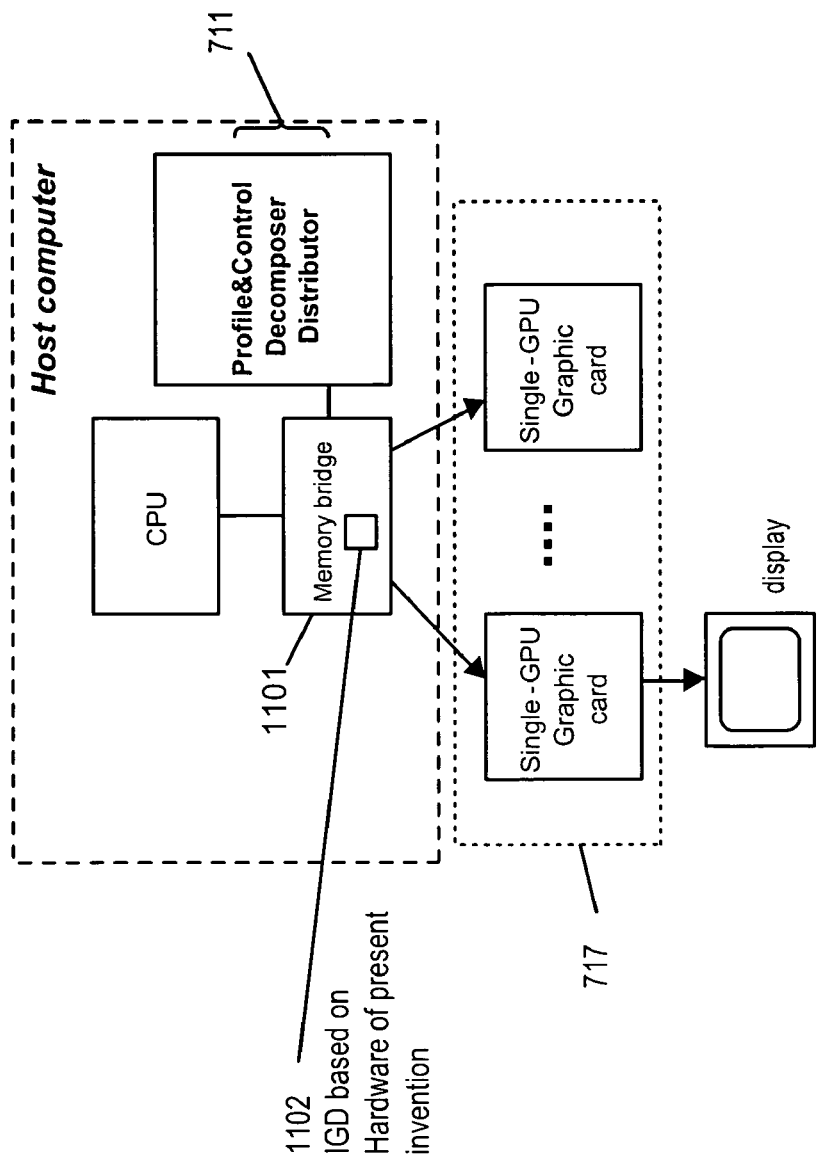
Figure 11B:
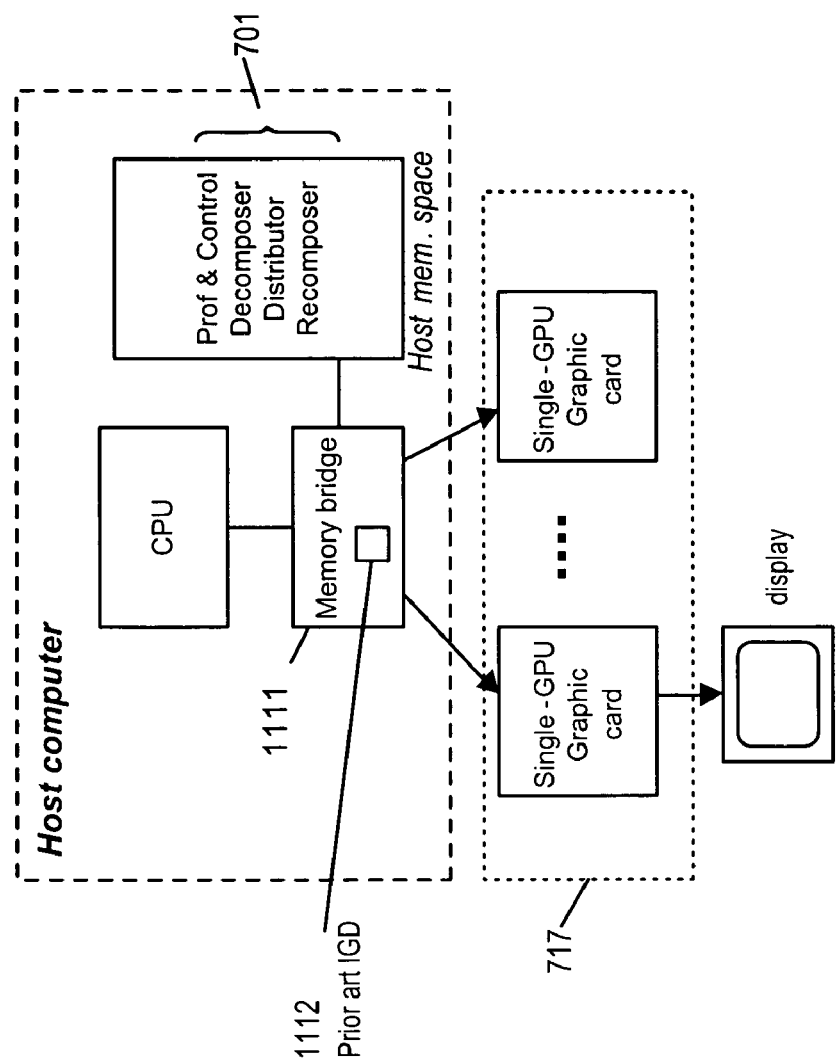

FIG. 7B is a schematic block representation of an illustrative hardware-based architecture of the multi-mode parallel 3D graphics rendering system of present invention (710), employing two GPUs, Graphic Hub (comprising Distributor Module 402" and Recomposer Module 403") and software components comprising the Profiling and Control Mechanism (400) and Decomposing Module (401);

FIG. 8A is a schematic block representation of a hardware-based embodiment of the multi-mode parallel graphics rendering system of the present invention present invention, using multiple discrete graphic cards and hardware-based distributor and recomposer components (402" and 403") implemented on a hardware-based hub of the present invention;

FIG. 8B is a schematic block representation of a first illustrative hardware-based embodiment of the multi-mode parallel graphics rendering system of the present invention present invention, using a discrete dual graphics cards and hardware-based distributor and recomposer components (402" and 403") implemented on a hardware-based hub of the present invention;

FIG. 8C is a schematic block representation of a second illustrative hardware-based embodiment of the multi-mode parallel graphics rendering system of the present invention, using discrete multiple graphics cards and hardware-based distributor and recomposer components (402" and 403") implemented on a hardware-based hub of the present invention;

FIG. 8D is a schematic block representation of a third illustrative hardware-based embodiment of the multi-mode parallel graphics rendering system of the present invention, using discrete multiple graphics cards and hardware-based distributor and recomposer components (402" and 403") implemented on a hardware-based hub of the present invention;

FIG. 8E is a schematic block representation of a software-based implementation of the multi-mode parallel graphics rendering system of the present invention, using multiple discrete GPUs, and software-based decomposer, distributor and recomposer components (701) implemented within host memory space of the host computing system;

FIG. 8F is a schematic block representation of a first illustrative embodiment of a software-based implementation of the multi-mode parallel graphics rendering system of the present invention, employing discrete dual GPU graphics cards and software-based decomposer, distributor and recomposer components (701) implemented within host memory space of the host computing system;

FIG. 8G is a schematic block representation of a second illustrative embodiment of a software-based implementation of the multi-mode parallel graphics rendering system of the present invention, employing discrete dual GPU graphics cards and software-based decomposer, distributor and recomposer components (701) implemented within host memory space of the host computing system;

FIG. 8H is a schematic block representation of a third illustrative embodiment of a software-based implementation of the multi-mode parallel graphics rendering system of the present invention, employing discrete dual GPU graphics cards and software-based decomposer, distributor and recomposer components (701) implemented within host memory space of the host computing system;

FIG. 9A is a schematic block representation of a generalized hardware implementation of the multi-mode parallel graphics rendering system of the present invention, wherein multiple GPUs (715) and hardware-based distributor and recomposer (hub) components (402" and 403") the present invention are implemented on a single graphics display card (902), and to which the display device is attached;

FIG. 9B is a schematic block representation of an illustrative embodiment of the multi-mode parallel graphics rendering system of the present invention, wherein multiple GPUs (715) and hardware-based distributor and recomposer (hub) components (402" and 403") the present invention are implemented on a single graphics display card (902), and to which the display device is attached;

FIG. 10A is a schematic block representation of a generalized hardware implementation of the multi-mode parallel graphics rendering system of the present invention using system on chip (SOC) technology, wherein multiple GPUs and the hardware-based distributor and recomposer are implemented on a single SOC-based graphics chip (1001) on a single graphics card (1002), while the software-based decomposer component is implemented in host memory space of the host computing system;

FIG. 10B is a schematic block representation of an illustrative embodiment of a SOC implementation of the multi-mode parallel graphics rendering system of the present invention, wherein multiple GPUs and hardware distributor and recomposer components are realized on a single SOC implementation of the present invention (1001) on a single graphics card (1002), while the software-based decomposer component is implemented in host memory space of the host computing system;

FIG. 10C is a schematic block representation of an illustrative embodiment of the multi-mode parallel graphics rendering system of the present invention, employing a multiple GPU chip installed on a single graphics card, and the software-based decomposer, distributor, and recomposer components of the present invention implemented in host memory space, and to which a single graphics card is attached, and to which the display device is attached;

FIG. 11A is a schematic block representation of an illustrative embodiment of the multi-mode parallel graphics rendering system of the present invention, implemented using (i) an integrated graphics device (IGD, 1101) within the memory bridge (1101) of the host computing system, implementing the hardware-based distributor and recomposer components of present invention, (ii) the software-based decomposer and distributor components of the present invention implemented within the host memory space, and (iii) multiple graphics display cards (717) connected to the IDG, and to which the display device is attached; and FIG. 11B is a schematic block representation of an illustrative embodiment of the multi-mode parallel graphics rendering system of the present invention, implemented using an integrated graphics device (IGD, 1112) within the memory bridge (1111) of the host computing system, and the software-based decomposer, distributor and recomposer components of the present invention implemented within the host memory space, and (iii) multiple graphics display cards (717) connected to the IDG, and to which the display device is attached.

DETAILED DESCRIPTION OF THE ILLUSTRATIVE EMBODIMENTS OF THE PRESENT INVENTION

Referring to the FIG. 4A through 11B in the accompanying Drawings, the various illustrative embodiments of the multiple-mode multiple GPU-based parallel graphics rendering system and process of the present invention will now be described in great detail, wherein like elements will be indicated using like reference numerals.

In general, one aspect of the present invention teaches how to dynamically retain high and steady performance of a three-dimensional (3D) graphics system on conventional platforms (e.g. PCs, laptops, servers, etc.), as well as on silicon level graphics systems (e.g. graphics system on chip (SOC), and integrated graphics device IGD implementations). This aspect of the present invention is accomplished by means of novel architecture of adaptive graphics parallelism having both software and hardware embodiments.

The multiple-mode multiple GPU-based parallel graphics rendering system fulfills the great need of the marketplace by providing a highly-suited parallelism scheme, wherein different GPU-parallel rendering schemes dynamically, alternate throughout the course of any particular graphics application, and adapting the optimal parallel rendering method (e.g. Image, Time or Frame Division Method) in real-time to meet the changing needs of the graphics application.

Multi-mode Parallel Graphics Rendering System Employing Automatic Profiling and Control As shown in FIG. 4A, the multi-mode parallel graphics rendering system of present invention employing automatic 3D scene profiling and multiple GPU control comprising: Multi-mode Parallel Rendering Subsystem including three parallelization stages realized by a Decompose Module (401), Distribute Module (402) and Recompose Module (403), and an array of Graphic Processing Units (GPUs); and (ii) Profiling and Control Mechanism (PCM) 400. Each stage is induced (i.e. set up) into a sub-state by set of parameters; A for 401, B for 402, and C for 403. The state of parallelism of the overall graphic system is established by the combination of sub-states A, B and C, as listed in the Mode/State Definition Table of FIG. 4A1 and as it will be elaborated hereinafter.

The unique flexibility of the multi-mode parallel graphics system stems from its ability to quickly change its sub-states, resulting in transition of the overall graphic system to another parallel state: Object Division State, Image Division State or Time Division, as well as to other potential parallelization schemes.

The array of GPUs (407) comprises N pairs of GPU and Video Memory pipelines, while only one of them, termed "primary," is responsible for driving the display unit (e.g.

LCD panel and the like). Each one of the staging blocks (i.e. Decompose Module (401), Distribute Module (402) and Recompose Module (403), carries out all functions required by the different parallelization schemes supported on the multi-mode parallel graphics rendering platform of the present invention.

The Decompose Module (401) splits up the stream of graphic data and commands according to the required parallelization mode. In general, the typical graphics pipeline is fed by stream of commands and data from the application and graphics library (OpenGL or Direct 3D). This stream, which is sequential in nature, has to be properly handled and eventually partitioned, according to parallelization method. The Decompose Module can be set to different decomposing sub-states (A1 through A4), according to FIG. 4A1: Object decomposition, Image decomposition, Alternate decomposition, and Single, for Object Division, Image Division, Time Division and Single GPU (non parallel), respectively. Each one of these parallelization states will be described in great technical detail below.

The Distribute Module (402) physically distributes the streams of data and commands to the cluster of GPUs. This Module is set to one of its B1 through B3 sub-states of Divide and Broadcast, for Object Division and Image Division States, respectively, and Single GPU substate, for the Time Division and Single GPU (i.e. non parallel system state).

The Re-compose Module (403) merges together the partial results of multiple graphics pipelines, according to parallelization mode. The resulting final Frame Buffer (FB) is sent into the display device. This Module has three (C1 through C3) sub-states. The Test based sub-state carries out re-composition based on predefined test performed on pixels of partial frame buffers; typically these are depth test, stencil test, or combination thereof. The Screen based sub-state combines together parts of the final frame buffers, in a puzzle like fashion, creating a single image. The None mode makes no merges, just moves one of the pipeline frame buffers to the display, as required in time division parallelism or in single GPU (non parallel).

The combination of all sub-states creates different parallelization schemes of the graphic system. A Definition Table of Sub-states is given in FIG. 4A1. The following discussion matches these sub-states with parallelization schemes of the Multi-mode Parallel Rendering System.

Image Division State of Operation:

In the Image division State of Operation, the Decompose Module, when set on Image Decomposition functional sub-mode (A=2), multiplicates the same command and data stream to all GPUs, and defines unique screen portion for each one, according to the specific image division mode in use (e.g. split screen, or tiled screen). The Distribute Module physically broadcasts the stream to all GPUs by setting up to Broadcast, B=2. Finally the Recompose Module collects all the partial images into final frame buffer, performing the screen based composition, C=2.

Time Division State of Operation:

In the Time Division State of Operation, each GPU renders the next successive frame. The Decompose Module is set to Alternate mode, A=3, alternating the command and data stream among GPUs on frame basis. The Distribute Module is set on Single mode, B=3, physically moving the stream to the designated GPU. Finally the Recompose Module is set on None, C=3, since no merge is needed and the frame buffer is just moved from the designated GPU to the screen for display.

Object Division State of Operation:

In the Object Division State of operation, the Decompose Module is set on Object Decomposition, A=1, decomposing the command and data stream, and targeting partial streams to different GPUs. The Distribute Module is set on Divide, B=1, physically delivering the partial commands and data to GPUs. Finally the Recompose Module is set on Test based mode, C=1, compositing the frame buffer color components of GPUs, based on depth and/or stencil tests.

Single GPU State of Operation:

While the Single GPU State of Operation is a non parallel state of operation, it is allowed and supported in the system of the present invention as it is beneficial in some exceptional cases. In the Single GPU State, the Decompose, Distribute, and Recompose Modules are set on Single (A=4), Single (B=3) and None (C=3), respectively. Only one GPU, of all pipelines, is used in the single case.

The Profiling and Control Mechanism (PCM)

As shown in FIG. 4A, the Profiling and Control Mechanism (PCM) comprises tri-parte structure comprising: Decompose Module (401); Distribute Module (402); and Recompose Module (403). As shown in FIG. 4A, the PCM comprises three algorithmic modules, namely:

(1) Application Profiling and Analysis Module (407);

(2) Parallel Policy Management Module (408); and (3) Distributed Graphics Function Control Module (409).

As indicated in the Module Definition Table of FIG. 4A1, each such Module (401), (402) and (403) has a sub-state, and each allowed state of the multi-mode parallel graphics rendering system (i.e. Image-Division State, Time-Division State, Object-Division State, and Single GPU State) is the determined by the combination of these sub-states, at any instant in time.

By virtue of such multi-state behavior of the parallel graphics rendering system of present invention, it is capable of high flexibility and high performance in comparison to prior art parallel graphics rendering systems.

As shown in FIG. 4A, the PCM (400) controls the state of the overall multi-mode parallel graphics rendering system, as well as the substates of the modules (401), (402) and 403, and interstate transitions thereof. The PCM (400) performs such system functions using two data stores, namely: the Historical Repository (404); and the Behavioral Profile DB (405).

As shown in the state transition diagram of FIG. 4B, when a graphics application starts, the PCM tries identifying whether this application is previously known to the system. All analyzed and known application profiles are stored in the Behavioral Profile DB (405). In case of a previously known application the optimal starting state is recommended by the DB, and also further on the behavioral database assists the PCM in course of application. Otherwise, as shown in FIG. 5C, a trial and error cycle of trying out all three parallelization schemes is exercised to choose the optimal one.

During the course of application the decision making on optimal parallelization is either supported by continuous profiling and analysis, and/or on trial and error. Trial & error is based on comparing results of a single (or very few) cycle spent by the system at each parallelization state. As shown in FIG. 5D, Trial & error can be driven by an event, e.g. drop of frame rate, or as indicated in FIG. 5C, performed periodically.

As indicated in the Mode Definition Table of FIG. 4A1, each parallel state is characterized by A, B, C sub-state parameters. The non-parallel state (i.e. "single" GPU state) is an exceptional state, which is reachable from any parallel state by application or by PCM demand.

As shown in the state transition diagram of FIG. 4B, the PCM considers the following parameters for determining when a state transition should occur:

(1) High texture volume, where a high value of this parameter will trigger (i.e. indicate) a transition to the Image Division and/or Time Division state of operation;

(2) High screen resolution, where a high value of this parameter will trigger a transition to the Image Division, and/or Time Division state of operation;

(3) High pixel layer depth, where a high value of this parameter will trigger a transition to the Image Division state of operation;

(4) High polygon volume, where a high value of this parameter will trigger a transition to the Object Division state of operation;

(5) FPS drop, where this parameter will trigger a transition to the trial & error cycle;

(6) Same FB, where this parameter will trigger use in successive frames, as a preventive condition from Time Division state of operation; and (7) High video memory footprint, where a high value of this parameter will trigger a transition to the Object Division state of operation.

Reference now is made to FIG. 5A showing a flowchart of the "Profiling And Control Cycle Process" wherein a state transition is based on above listed parameters (1)-(7). In this process, Steps A-C test whether the graphics application is listed in the Behavioral DB. If the application is listed in the Behavioral DB, then application's profile is taken from the DB (step E), a preferred state is set (at Step G), N successive frames are rendered (steps I-J), performance data collected (step K), by the way addition to Historical Repository (step M) and analyzed for next optimal state (step F). Upon conclusion of application, the Behavioral DB is updated at Step N by the collected data from Historical Repository.

As depicted in FIG. 5B, the "Periodical Trial & Error" Process differs from the above process/method in its empirical approach. The best parallelization scheme for the graphical application at hand is chosen by a series of trials (Steps A-M). After N frames (performed during Steps N-O) another periodical trial is done. In order to omit slow and not necessary trials, a preventive condition for any of parallelization schemes can be set and tested (during Steps B, E, and H), such as use by the application of the Frame Buffer FB for the next successive frame, which prevents entering the Time Division State.

FIG. 5C shows a flowchart of a slightly different empirical approach, in which the tests towards change of state are done only in case of drop-in-frame-rate event (as indicated during Steps O, B-M).

As shown in FIG. 4A, the Profiling and Control Mechanism (PCM) comprises three algorithmic components, namely: a Application Profiling and Analysis Module (407); Parallel Policy Management Module (408) and Distributed Graphics Function Control. Each of these components will now be described in greater technical detail with reference to FIG. 5D.

The Application Profiling and Analysis Module

As shown in FIG. 5D, the Application Profiling and Analysis (407) module monitors and analyzes profiling data of running application. The inputs into and the tasks of the Application Profiling and Analysis Module are shown in FIG. 5D.

The Application Profiling and Analysis Module performs its analysis based on the following:

(1) The performance data collected from several sources, such as vendor's driver, GPUs, chipset, and optionally—from graphic Hub;

(2) Historical repository (404) which continuously stores up the acquired data (i.e. this data having historical depth, and being used for constructing behavioral profile of ongoing application);

(3) Knowledge based Behavioral Profile DB (405) which is an application profile library of previously known graphics applications (and further enriched by newly created profiles based on data from the Historical Depository).

The choice of parallelism is based on profiling and analysis of the system's performance at Performance Data Inputs from several sources within the graphics system: GPUs, vendor's driver, chipset, and graphic Hub (optional). The performance data includes the following components, needed for estimating the performance and locate casual bottlenecks:

(i) texture count
(ii) screen resolution
(iii) polygon volume
(iv) at each GPU utilization of
 (a) Geometry engine
 (b) Pixel engine
 (c) Video memory
(v) Utilization of CPU
(vi) total pixels rendered
(vii) total geometric data rendered
(viii) workload of each GPU
(ix) volumes of transferred data The Performance Data is fed and processed for real time analysis and following tasks of the Application Profiling and Analysis module:

(1) Recognition of application
(2) Processing of trial & error results
(3) Utilization of application profile from Behavioral DB
(4) Data Aggregation in Historical Repository
(5) Analysis of input performance data
(6) Analysis based on integration of
 (a) frame-based "atomic" performance data
 (b) aggregated data at Historical Repository
 (c) Behavioral DB data
(7) Detection of rendering algorithms used by application
(8) Detection of use of FB in next successive frame as a preventive condition for time division mode
(9) Recognition of preventive conditions for other parallel modes
(10) Evaluation of pixel layer depth at the pixel subsystem of GPU
(11) Frame/sec count
(12) Detection of critical events (e.g. frame/sec drop)
(13) Detection of bottlenecks in graphics pipeline
(14) Measure and balance of load among GPUs
(15) Update Behavioral DB from Historical Depository
(16) Selection of optimal parallel mode Selection of Optimal Parallel Method (i.e. State) by the PCM Each parallel mode excels in a different set of bottlenecks. In a well defined case, Object-Division Method supersedes the other division modes in that it reduces more bottlenecks. In contrast to Image-Division, that reduces only the fragment/ fill bound processing at each GPU, the Object-Division Mode relaxes bottleneck across the pipeline: (i) the geometry (i.e. polygons, lines, dots, etc) transform processing is offloaded at each GPU, handling only 1/N of polygons (N—number of participating GPUs); (ii) fill bound processing is reduced since less polygons are feeding the rasterizer, (iii) less geometry memory is needed; (iv) less texture memory is needed.

The Time-Division Mode is favorable for the bottlenecks of transform and fill by allowing more time, however the video memory bottleneck remains unsolved. Moreover, this method suffers from severe problems such as (i) CPU bottlenecks, (ii) the GPU generated frame buffers are not available to each other in cases the previous frame is required as a start point for the successive one, and (iii) from pipeline latency. In many applications these are stoppages from using time division; however, for some other applications this method may be suitable and perform better than other parallelization schemes.

Automated transition to the Object-Division State of operation effectively releases the parallel graphics system of the present invention from transform and video memory loads. However, for fill loads, the Object Division State of operation will be less effective than the Image Division State of operation.

At this juncture it will be helpful to consider under what conditions a transition from the Object Division State to the Image-Division State can occur, so that the parallel graphics system of the present invention will perform better "fill loads", especially in higher resolution.

Notably, the duration of transform and fill phases differ between the Object and Image Modes (i.e. States) of operation. For clarity purposes, consider the case of a dual GPU system. Image-division render time is given by:

$$T_{ObjDiv} = \text{Transform} + \text{Fill}/2 \qquad (1)$$

whereas in Object-Division the fill load does not reduce in the same factor as transform load.

The render time is:

$$T_{ImgDiv} = \text{Transform}/2 + \Phi_{DepthComplexity} * \text{Fill}/2 \qquad (2)$$

The fill function $\Phi_{DepthComplexity}$ in Object-Division Mode depends on depth complexity of the scene. Depth complexity is the number of fragment replacements as a result of depth tests (the number of polygons drawn on every pixel). In the ideal case of no fragment replacement (e.g. all polygons of the scene are located on the same depth level) the second component of the Object-Division Mode reduces to $$T_{ImgDiv} = \text{Transform}/2 + \text{Fill}/2 \qquad (2.1)$$

However, when depth complexity is getting high, the advantage of Object-Division Mode drops down, and in some cases the Image-Division Mode may even perform better, e.g. applications with small number of polygons and high volume of textures.

The function $\Phi_{DepthComplexity}$ denotes the way the fill time is affected by depth complexity:

$$\Phi_{DepthComplexity} = \frac{2E(L/2)}{E(L)} \qquad (3)$$

where E(L) is the expected number of fragments drawn at pixel for L total polygon layers.

In ideal case $\Phi_{DepthComplexity} = 1$. E is given by:

$$E(m) = 1 + \frac{1}{m}\left(\sum_{i=1}^{m-1} E(i)\right) \qquad (3.1)$$

For a uniform layer-depth of L throughout the scene, the following algorithm is used to find switching conditions from Object-Division Mode to Image-Division Mode:

$$\text{chose\_div\_mode}(\text{Transform}, \text{Fill}) = \begin{cases} \text{ObjectDivision} & \text{Transform} + \frac{\text{Fill}}{2} > \frac{\text{Transform}}{2} + \frac{\text{Fill}}{2} \times \Phi_{DepthComplexity} \\ \text{ImageDivision} & \text{otherwise} \end{cases} \qquad (4)$$

An algorithm to choose between Image-Division and Object-Division Modes detects which of transform and fill bound processing is smaller. Once the layer-depth reaches some threshold value throughout the scene; Object-Division Mode will not minimize the Fill function any more.

EXAMPLE

Consideration of a General Scene

Denote the time of this drawing of n polygons and p pixels as Render(n,p), and by P the time taken to draw one pixel. Here the drawings time is assumed to be constant for all pixels (which may be a good approximation, but is not perfectly accurate). Also, it is assumed that the Render function, which is linearly dependent on p (the number of pixels actually drawn), is independent of the number of non-drawings that were calculated. This means that if the system has drawn a big polygon that covers the entire screen surface first, then for any additional n polygons: Render(n,p)=p×P.

$$\text{Render}(n, p) = \sum_{i=1}^{\infty} P \times |\{x \mid \text{LayerDepth}(x) = i\}| \times E(i) \qquad (5)$$

The screen space of general scene is divided into sub-spaces based on the layer-depth of each pixel. This leads to some meaningful figures.

For example, suppose a game engine has most of the screen (90%) with a depth of four layers (the scenery) and a small part covered by the player (10%) with a depth of 20 layers. The value of Render without Object Division Mode support is given by:

Render(n,p)=p×0.9×E(4)+p×0.1×
E(20)=2.2347739657143681×p

While with Object-Division Mode support, one gets:

Render(n/2,p)=p×0.9×E(4/2)+p×0.1×
E(20/2)=1.6428968253968255×p

Notably, the improvement factor in this case is thus 1.3602643398952217.

A CAD engine, on the other hand, might have a constant layer depth of 4.

The following table shows the improvement factor for interesting cases:

| Big part (90%) depth | Small part (10%) layer depth | Object-Division, improvement factor Render function |
|---|---|---|
| X | x | E(x) (this follows immediately from |
| 2 | 4 | 1.4841269841269842 |
| 4 | 2 | 1.3965517241379308 |
| 10 | 100 | 1.2594448158034022 |

It is easily seen that when the layer depth $\Phi_{DepthComplexity}$ is getting larger, the Object Division Mode is not improving the rendering time by a large amount and if rendering time is the bottleneck of the total frame calculation procedure, then the Image-Division Mode might be a better approach.

The analysis results by Application Profiling and Analysis Module are passed down to the next module of Parallel Policy Management Module.

Parallel Policy Management Module

Parallel Policy Management module (408) makes up final decision regarding the preferred parallel mode, based on profiling and analysis results of the previous module. The decision is made per some N frames basis. As shown above, the layer depth factor, differentiating between the effectiveness of object division vs. image division can be evaluated by analyzing the relationship of geometric data vs. fragment data at a scene, or alternatively can be found heuristically. illustrative control policies have been described above and in FIGS. 5A-5C.

Distributed Graphic Function Control

Distributed Graphic Function Control Module (409) carries out all the functions associated with the different parallelization modes according to decision made by the Parallel Policy Management Module. The Distributed Graphic Function Control Module (409) drives directly the configuration sub-states of the Decompose, Distribute and Recompose Modules, according to the parallelization mode. Moreover, it includes drivers needed for hardware components such as graphic Hub, described herein later in the specifications.

The General Software Architecture of Present Invention

The multi-mode parallel graphics rendering system of present invention employing automatic scene profiling and mode control has two principally different embodiments, expressed in software and hardware, although both are embraced by the scope and spirit of the present invention illustrated in FIG. 4A.

As illustrated in FIG. 6A, a generalized software embodiment is the new General Software Architecture of present invention, block, showing the Profiling and Control Mechanism (400) that supervises the flexible parallel structure of multi-GPU rendering system. The Profiling and Control Mechanism has been already thoroughly described in reference to FIG. 4A.

The multiple-GPU rendering system comprises of Decompose Module (401'), Distribute Module (402'), Recompose Module (403'), and Cluster of Multiple GPUs (410').

The Decompose Module is implemented by three software modules, OS-GPU interface and Utilities, Division Control and State Monitoring.

OS-GPU Interface and Utilities performs all the functions associated with interaction with the Operation System, graphic library (e.g. OpenGL or DirectX), and interfacing with GPUs. It is responsible for interception of the graphic commands from the standard graphic library, forwarding and creating graphic commands to Vendor's GPU Driver, controlling registry and installation, OS services and utilities. Another task of this module is reading performance data from different sources (GPUs, vendor's driver, chipset) and forwarding the data to Profiling and Control Mechanism.

Division Control controls the division parameters and data to be processed by each GPU, according to parallelization scheme, e.g. division of data among GPUs in object division mode, or image partition among GPUs in image division mode.

In Object Division Mode the polygon division control consists of sending each polygon randomly to a different GPU. This is an easy algorithm to implement, while turns out to be quite efficient. There are different variants on this basic algorithm.

Distribution of Vertex Arrays

Instead of randomly dividing the polygons, every even polygon can be sent to GP1 and every odd polygon to GPU2 (or more GPUs accordingly). Or alternatively, vertex-arrays are kept in their entirety and sent to different GPUs, as the input might be of the form of vertex arrays, and dividing it may be too expensive.

Dynamic Load Balancing by Polygons

GPU loads are detected at real time and the next polygon is sent to the least loaded GPU. Dynamic load balancing by complex objects (built out of polygons). GPU loads are detected at real time and the next object is sent to the least loaded GPU.

State Monitoring Handles State Validity Across the System

The graphic libraries (e.g. OpenGL and DirectX) are state machines. Parallelization must preserve cohesive state across the graphic system. It is done by continuous analysis of all incoming commands, while the state commands and some of the data must be duplicated to all pipelines in order to preserve the valid state across the graphic pipeline. This function is exercised mainly in object division scheme, as disclosed in detail in inventor's previous pending patent PCT/IL04/001069.

The Distribute Module is implemented by the Distribution Management module, which addresses the streams of commands and data to the different GPUs via chipset outputs, according to needs of the parallelization schemes.

The Re-compose Module is realized by two modules: (i) Merge Management handling the read-back of frame buffers and the compositing sub-states of: test based, screen based and none. (ii) Merger is an algorithmic module that performs the different compositing algorithms:

The Test Based sub-state suits compositing of object division. Sets of Z-buffer, stencil-buffer and color-buffer are read back from GPU FBs to host's memory for compositing. The pixels of color-buffers from different GPUs are merged into single color-buffer, based on per pixel comparison of depth and/or stencil values (e.g. at given x-y position only the pixel associated with the lowest z value is let out to the output color-buffer). This is a software technique to perform hidden surface elimination among multiple frame buffers required for object division mode. Frame buffers are merged based on depth and stencil tests. Stencil tests, with or without combination with depth test, are used in different multipass algorithms. The final color-buffer is down-loaded to the primary GPU for display.

Screen Based Sub-state Suits Image Division Parallelism

Screen based compositing is a puzzle like merging of image portions from all GPUs into a single image at the primary GPU, and sent out to display. It is a much simpler procedure than Test Based, no tests are needed. While the primary GPU is sending its color-buffer segment to display, the Merger reads back other GPUs color-buffer segments to host's memory just for downloading them into primary GPU's FB for display.

None functioning mode is a non-compositing option moving the incoming Frame Buffer to the display. It is used when no compositing is required. In time division a single color-buffer is just read back from a GPU to host's memory and downloaded to primary GPU for display. In a non-parallel case of single GPU, usually the primary GPU is employed for rendering, so no host memory transit is needed.

The Hardware Hub Based Architecture of Present Invention

The hardware embodiment is the new Graphic Hub Based Architecture of present invention, block diagramed in FIG. 6B, showing the Profiling and Control Mechanism (400) that supervises the flexible Hub based structure creating a real-time adaptively parallel multi-GPU system. Since the Profiling and Control Mechanism (400) has been already thoroughly described in reference to FIG. 4A, we concentrate on the Decompose (401'), Distribute (402"), and Recompose (403") modules. The Decompose is a software module residing in the host, while Distribute and Recompose Modules are hardware based components residing in the Hub hardware, external to the host.

The Decompose Module is similar to the one of software embodiment, described above. Therefore we indicate only the dissimilarities of this module in hardware embodiment of present invention.

OS-GPU Interface and Utilities

Additional source of performance data, on top of the GPUs, vendor's driver, and chipset, is the internal profiler in the Hub Distribute Module, as shown in FIG. 6B.

Additional function of the OS-GPU Interface and Utilities block is driving the Hub hardware by means of soft driver.

Division Control

All commands and data are processed for decomposition in this module and marked for division, however they all are sent in a single stream into Distribute Module of the Hub for physical distribution.

The function of the Graphic Hub hardware is to interconnect the host and the cluster of GPUs, as shown in FIG. 6B. There are two basic functionalities on it: Distribute Module (402") and Recompose Module (403"). From the functional point of view the Distribute Module resides before the cluster, delivering commands and data for rendering (the "pre GPU unit"), and the Recompose Module that comes after the cluster and collects post rendering data ("post GPU unit"), however physically both units share the same hardware unit (e.g. silicon chip).

The Distribute Module (402") consists of three functional units: Router Fabric, Profiler, and Hub Control.

The Router Fabric is a configurable switch (e.g. 5 way PCI express x16 lanes switch) that distributes the stream of geometric data and commands to GPUs. It can be set to one of three sub-states described therein before: Divide, Broadcast, and Single.

The Profiler, being close to the raw data passing by, monitors these data for profiling. The collected data is mainly related to the performance of Geometry subsystem. Another part of Hub profiling is resident to the Recompose Module. Both profilers unify their performance data and deliver it as a feedback to Profiling and Control Mechanism, via Decompose Module.

The Hub Control, a central control unit to the Hub, is under control of the Distributed Graphics Function Control unit of the Profiling and Control Mechanism at the host.

The Recompose Module (403") consists of hardware blocks of Merge management, Merger, Profiler and Router Fabric.

The Merge management unit handles the read-back of frame buffers and the compositing sub-states of: test based, screen based and none, described above in great detail.

The Merger is an algorithmic module that performs the different compositing algorithms of object division, image division and time division.

The Profiler collects performance data related to the pixel subsystem of GPUs. This data is passed to the other profiling unit (at Distribute Module), unified and moved to the host.

The Router Fabric is a configurable switch (e.g. 5 way PCI express x16 lanes switch) that collects the streams of read-back FB data from GPUs, to be delivered to the Merger unit.

Illustrative Example of a Software Architecture of the Multi-Mode Parallel Graphics Rendering System of the Present Invention FIG. 7A shows an illustrative example of software architecture for the multi-mode parallel graphics rendering system of the present invention comprising two GPUs (700). This illustrative system architecture is implemented on a conventional PC platform with a dual-bus chipset. Its software package (701) comprises Profiling and Control Mechanism (400) and a suit of three parallelism driving modules namely: the Decomposing Module (401), the Distributing Module (402) and the Recomposing Module (403).

Illustrative Example of Hardware (Hub-Based) of the Multi-Mode Parallel Graphics Rendering System of the Present Invention FIG. 7B shows an illustrative example of hardware (Hub-based) architecture for the multi-mode parallel graphics rendering system of the present invention (710), implemented on a conventional PC architecture with a single-bus chipset. The illustrative system architecture comprises a software driver (711) and Graphic Hub. The software components comprise the Profiling and Control Mechanism (400), and the Decomposing module (401). The cluster of GPUs (717) includes primary GPU (715 primary) attached to Display and number of secondary GPUs (715).

Various Options for Implementing the Multi-Mode Parallel Graphics System of the Present Invention The multi-mode parallel graphics rendering system of present invention employing automatic profiling and multiple GPU control mechanism has two embodiments, software and hardware. As such, the present invention can be implemented on a great variety of conventional PC, laptop, servers and other architectures, as well as new systems in the following ways In FIG. 8A, a general approach is shown for a hardware implementation of the system of the present invention using multiple discrete graphic cards. In FIGS. 8B-8D, there are shown three possible packaging options. In FIG. 8B, there is shown an extender card (811) with a graphic Hub chip, on a PC motherboard (814), having two graphic card mounted (812, 813). In FIG. 8C, there is shown an external multiple-GPU box, having graphic HUB chip on backplane, connected by PCIexpress cable to the host. In FIG. 8D, there is shown a Graphic Hub chip (402"+403") implemented on a motherboard (831), with multiple graphic cards (832).

In FIG. 8E, a general approach is shown for a software implementation of system of the present invention using multiple discrete GPUs. In FIGS. 8F-8H, there are three possible three possible options here. In FIG. 8F, there is shown a PC platform with dual GPU cards plus software embodiment of present invention. In FIG. 8G, there is shown a PC or another platform with discrete multiple GPU card and plus software embodiment of present invention. In FIG. 8H, there is shown an external multiple-GPU box, connected by PCIexpress cable to the host, plus software embodiment of present invention.

In FIG. 9A, a general approach is shown for a hardware implementation of present invention using single graphic card with multiple GPUs. In FIG. 9b, one option is shown.

In FIG. 10, a general approach is shown for hardware implementation of system of the present invention using system on chip (SOC) (1001) with monolithic Hub implementation and multiple GPUs. In FIG. 10B, one possible SOC (1001) implementation is shown conceptually.

In FIG. 10C, a general approach is shown for a software implementation of system of the present invention (701) using multiple GPUs chip (1031).

FIG. 11A, a general approach is shown for a hardware implementation of system of the present invention using integrated graphic device (IGD, 1101) implementation including silicon embodiment of hardware distributor and recomposer of present invention. Today the use of IGD is an alternative to external card, only one of them can work at a time. However, the present invention enables joining forces of the IGD with one or more external cards to boost the graphics performance. In FIG. 11B, a general approach is shown for a software implementation of the system of the present invention, wherein an integrated graphics device (IGD, 1111) plus software embodiment of present invention.

While the illustrative embodiments of the present invention have been described in connection with various PC-based computing system applications, it is understood that that parallel graphics systems and rendering processes of the present invention can also be used in video game consoles and systems, mobile computing devices, e-commerce and POS displays and the like.

It is understood that the parallel graphics rendering technology employed in computer graphics systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

The invention claimed is:

1. A multi-mode parallel graphics rendering system (MMPGRS) embodied within a host computing system having a CPU for executing one or more graphics-based applications, CPU memory for storing said one or more graphics-based applications and a graphics library for generating graphics commands and data during the execution of each said graphics-based application, and a display device for displaying images of a 3D scene containing graphics during the execution of said one or more graphics-based applications, said MMPGRS supporting object, image and time division modes of parallel operation and comprising:
   (1) a multi-mode parallel graphics rendering subsystem including
      (i) three parallelization stages including a decompose module, a distribute module and a recompose module, and
      (ii) a plurality of graphic processing pipelines (GPPLs) for supporting a graphics rendering process that employs two or more of modes of parallel graphics rendering operation during a single session of said one or more graphics-based applications in order to execute graphic commands and process graphics data and generate images of said 3D scene for display, wherein each said GPPL includes a primary GPPL having a frame buffer for recompositing images; and
   (2) a profiling and control mechanism (PCM) having a profiling and control cycle for automatically and dynamically profiling, on a frame by frame basis, said one or more graphics-based applications being executed on said host computing system, and controlling the modes of parallel graphics rendering operation of said MMPGRS during run-time of said one or more graphics based applications;
   wherein for each said mode of parallel graphics rendering operation supported by said MMPGRS, said MMPGRS has one state of corresponding operation;
   wherein said PCM performs profiling and control functions using multiple data stores, including (i) a historical repository for continuously storing up acquired data having historical depth, to construct a behavioral profile of currently running graphics-based applications, and (ii) a behavioral profile database (DB) for storing an application profile library of prior-known graphics-based applications, and enriched by newly constructed profiles for said prior-known graphics-based applications using data accessed from said historical repository;
   wherein said decompose module divides up the stream of graphic commands and data according to the mode of parallel graphics rendering operation determined by said PCM;
   wherein said distribute module physically distributes the streams of graphics commands and data to said plurality of GPPLs;
   wherein said GPPLs execute said graphics commands using said graphics data and generate partial pixel data sets associated with frames of pixel images to be composited by the primary GPPL in said MMPGRS; and
   wherein said recompose module merges together the partial pixel data sets produced from said GPPLs, according to said mode of parallel operation at any instant in time, and producing a final pixel data set within the frame buffer of said primary GPPL, which is sent into said display device for display;
   wherein said decompose module, said distribute module and said recompose module each have multiple sub-states of operation, and cooperate to carry out all functions required by the different modes of parallel graphics rendering operation supported on said MMPGRS;
   wherein said PCM controls the sub-states of said decompose, distribute and recompose modules, and transitions of the sub-states of said decompose, said distribute and said recompose modules; and
   wherein each of said decompose, distribute and recompose modules is induced into a sub-state by setting parameters, and the mode and also the state of parallel graphics rendering operation of said MMPGRS is established by the combination of said sub-states.

2. The MMPGRS of claim 1, wherein said plurality of GPPLs comprises a plurality of pairs of GPU and video memory pipelines; and wherein only one of said GPPLs is designated as the primary GPPL and is responsible for driving said display device with a final pixel image composited within a frame buffer (FB) maintained by said primary GPPL, and all other GPPLs function as secondary GPPLs, supporting the pixel image recompositing process.

3. The MMPGRS of claim 1,
   wherein the sub-states of said decompose module are selected from the group consisting of object decomposition, image decomposition, alternate decomposition, and single GPPL for the object division, image division, time division and single GPPL (non parallel) modes of operation, respectively;

wherein the sub-states of said distribute module are selected from the group consisting of divide and broadcast sub-states for object division and image division modes of operation, and single GPPL sub-state for the time division and single GPPL mode of operation; and wherein the subs-states of said recompose module are selected from the group consisting of (i) test based sub-state which carries out re-composition based on pre-defined tests performed on pixels of partial frame buffers, (ii) screen based sub-state which combines together parts of the final frame buffers, and (iii) the None mode which makes no merges, just moves one of the pipeline frame buffers to the display device, as required in time division parallelism or in a single GPPL (non parallel) mode.

4. The MMPGRS of claim 1, wherein said display device comprises an LCD panel.

5. The MMPGRS of claim 1, wherein said host computing system is any computing machine supporting real-time generation and display of 3D graphics.

6. The MMPGRS of claim 2, wherein said GPU comprises a geometry processing subsystem and a pixel processing subsystem.

7. The MMPGRS of claim 1, wherein when a graphics-based application starts, said PCM tries identifying whether said graphics-based application is previously known to said MMPGRS and its profile recorded in said behavioral database; and wherein in the case of a previously known graphics-based application, the optimal starting state of said MMPGRS is recommended by said behavioral profile database; and during the course of profiling said one or more graphics-based applications, said behavioral database assists said PCM.

8. The MMPGRS of claim 1, wherein said profiling and control cycle comprises a periodical trial and error based control cycle.

9. The MMPGRS of claim 1, wherein said profiling and control cycle comprises an event driven trial and error control cycle.

10. The MMPGRS of claim 1, wherein said multiple modes of parallel graphics rendering operation are selected from the group consisting of an object division mode of parallel graphics rendering operation, an image division mode of parallel graphics rendering operation, and a time division mode of parallel graphics rendering operation.

11. The MMPGRS of claim 10, wherein while determining when a state transition should occur within said MMPGRS, said PCM considers one or more of the following parameters selected from the group consisting of:

(1) high texture volume, where a high value of this parameter will trigger a transition to the image division and/or time division mode of operation;

(2) high screen resolution, where a high value of this parameter will trigger a transition to the image division, and/or time division mode of operation;

(3) high pixel layer depth, where a high value of this parameter will trigger a transition to the image division mode of operation;

(4) high polygon volume, where a high value of this parameter will trigger a transition to the object division mode of operation;

(5) FPS drop, where this parameter will trigger a transition to a trial and error cycle;

(6) same frame buffer, where this parameter will trigger use in successive frames, as a preventive condition from the time division mode of operation; and (7) high video memory footprint, where a high value of this parameter will trigger a transition to the object division mode of operation.

12. The MMPGRS of claim 1, wherein said PCM tests whether the graphics-based application is listed in said behavioral profile database; if the graphics-based application is listed in said behavioral database, then the profile of said graphics-based application is taken from said behavioral profile database, a preferred state is set, N successive frames are rendered, performance data is collected, and added to said historical repository and analyzed for next optimal state; and upon conclusion of said graphics-based application, said behavioral database is updated by the collected data from said historical repository.

13. The MMPGRS of claim 2, wherein each said GPPL comprises a GPU including a geometry engine, a pixel engine, and video memory, and wherein said PCM further comprises:

an application profiling and analysis module;
a parallel policy management module; and
a distributed graphics function control module; and
wherein said application profiling and analysis module monitors and analyzes profiling data on said one or more graphics-based applications, and performs analysis based on the data selected from the group consisting of:

(i) performance data collected from several sources selected from the group consisting of vendor's driver, GPUs, a chipset, and a graphic hub device, for estimating the performance of said several sources and locating bottlenecks;

(ii) data stored in said historical repository; and (iii) data stored in said behavioral profile database.

14. The MMPGRS of claim 13, wherein said performance data includes data elements selected from the group consisting of:

(i) texture count;
(ii) screen resolution;
(iii) polygon volume;
(iv) at each GPU, utilization of (a) a geometry engine, (b) a pixel engine, and (c) video memory;
(v) Utilization of CPU;
(vi) total pixels rendered;
(vii) total geometric data rendered;
(viii) workload of each GPU; and
(ix) volumes of transferred data.

15. The MMPGRS of claim 13, wherein said application profiling and analysis module processes said performance data for real time analysis and the performance of one or more tasks selected from the group consisting of:

(1) Recognition of said one or more graphics-based applications;

(2) Processing of trial & error results;

(3) Utilization of application profiles from said behavioral profile database;

(4) Data Aggregation in said historical repository;

(5) Analysis of input performance data;

(6) Analysis based on integration of (a) frame-based "atomic" performance data, (b) aggregated data in said historical repository, and (c) data in said behavioral profile database;

(7) Detection of rendering algorithms used by said one or more graphics-based applications;

(8) Detection of use of frame buffer (FB) in next successive frame as a preventive condition for time division mode;

(9) Recognition of preventive conditions for other parallel modes;
(10) Evaluation of pixel layer depth at the pixel engine of each GPU;
(11) Frame/sec count;
(12) Detection of critical events (e.g. frame/sec drop);
(13) Detection of bottlenecks in said GPPLs;
(14) Measure and balance of load among GPUs;
(15) Update said behavioral profile database from said historical repository; and
(16) Selection of optimal parallel mode of operation.

16. The MMPGRS of claim 1, wherein said PCM, said decompose module, said distribute module and said recompose module are implemented as a software package within said CPU memory, and wherein said GGPLs include at least two GPUs supported on external graphics cards.

17. The MMPGRS of claim 1, wherein said PCM and said decompose module are implemented as a software package within said CPU memory, while said distribute and recompose modules are implemented in a hardware-based graphics hub device, and wherein said GGPLs include at least two GPUs supported on external graphics cards connected to said CPU via said graphics hub device and a bridge circuit; and wherein said display device is connected to said graphics hub device.

18. The MMPGRS of claim 1, wherein said PCM and said decompose module are implemented as a software package within said CPU memory, while said distribute and recompose modules are implemented in a hardware-based graphics hub device supporting said GGPLs.

19. The MMPGRS of claim 18, wherein said graphics hub device is implemented as a single SOC-based graphics chip on a single graphics card to which said graphics hub device is connected.

20. The MMPGRS of claim 1, wherein said PCM and said decompose module are implemented as a software package within said CPU memory, while said distribute and recompose modules are implemented in a graphics hub device within an integrated graphics device (IGD) supporting a GPU, and wherein said GGPLs include at least one GPU on an external graphics card connected to said CPU via said IGD and a bridge circuit.

21. The MMPGRS of claim 1, where said PCM and said decompose module are implemented as a software package within said CPU memory, while said distribute and recompose modules are implemented in a graphics hub device within an integrated graphics device (IGD), and wherein said GGPLs include multiple graphics cards, each supporting at least one GPU, and being connected to said IGD, while said display device is connected to said IGD.

* * * * *